(12) United States Patent
Walker et al.

(10) Patent No.: US 7,856,379 B2
(45) Date of Patent: Dec. 21, 2010

(54) PRE-SALE DATA BROADCAST SYSTEM AND METHOD

(75) Inventors: Jay. S Walker, Ridgefield, CT (US); Daniel E. Tedesco, New Canaan, CT (US); Magdalena Mik, Stamford, CT (US)

(73) Assignee: Walker Digital, LLC, Stamford, CT (US)

( * ) Notice: Subject to any disclaimer, the term of this patent is extended or adjusted under 35 U.S.C. 154(b) by 0 days.

(21) Appl. No.: 11/549,435

(22) Filed: Oct. 13, 2006

(65) Prior Publication Data

US 2007/0073587 A1 Mar. 29, 2007

Related U.S. Application Data

(63) Continuation of application No. 09/221,099, filed on Dec. 28, 1998, now Pat. No. 7,236,942, which is a continuation-in-part of application No. 08/994,426, filed on Dec. 19, 1997, now Pat. No. 6,694,300, and a continuation-in-part of application No. 09/166,405, filed on Oct. 5, 1998, now Pat. No. 6,405,174.

(51) Int. Cl.
*G06Q 20/00* (2006.01)
(52) U.S. Cl. ................. 705/16; 705/23; 705/51
(58) Field of Classification Search ............ 705/16, 705/51, 23
See application file for complete search history.

(56) References Cited

U.S. PATENT DOCUMENTS 3,573,747 A 4/1971 Adams et al.
3,691,527 A 9/1972 Yamamoto
3,705,384 A 12/1972 Wahlberg
3,747,733 A 7/1973 Knickerbocker
3,937,929 A 2/1976 Knauer
RE29,450 E 10/1977 Goldsby et al.
4,108,361 A 8/1978 Krause
4,237,537 A 12/1980 Pitches et al.
4,245,730 A 1/1981 Bachmann et al.
4,258,837 A 3/1981 Manos et al.

(Continued)

FOREIGN PATENT DOCUMENTS

CA 2070736 A1 6/1992

(Continued)

OTHER PUBLICATIONS

Quinn, Jane Byrant, "New Cars for Less", Newsweek; Oct. 23, 1978; Section: The Columnists; p. 80, 2 pp.

(Continued)

*Primary Examiner*—Pierre E Elisca
(74) *Attorney, Agent, or Firm*—Fincham Downs LLC; Michael D. Downs

(57) ABSTRACT

A method for promoting the sale of a substitute product at the point of sale (POS). At least one POS terminal communicates with a POS server which in turn communicates with various manufacturer servers to transmit information therebetween. Upon the presentation of an original product for purchase by a consumer at a POS terminal, various manufacturers may decide to offer a substitute product to the consumer, prior to completing the purchase of the original product. As such, various manufacturers may offer promotional offers to encourage the buyer to favorably "switch" products. If the customer accepts the offer, the point of sale terminal completes the sale of the substitute product.

18 Claims, 13 Drawing Sheets

U.S. PATENT DOCUMENTS

| | | |
|---|---|---|
| 4,282,575 A | 8/1981 | Hoskinson et al. |
| 4,316,532 A | 2/1982 | Levasseur |
| 4,323,770 A | 4/1982 | Dieulot et al. |
| 4,341,951 A | 7/1982 | Benton |
| 4,359,147 A | 11/1982 | Levasseur |
| 4,376,479 A | 3/1983 | Sugimoto et al. |
| 4,412,292 A | 10/1983 | Sedam et al. |
| 4,420,751 A | 12/1983 | Paganini et al. |
| 4,478,353 A | 10/1984 | Levasseur |
| 4,494,197 A | 1/1985 | Troy et al. |
| 4,498,570 A | 2/1985 | King et al. |
| 4,551,935 A | 11/1985 | Bachmann et al. |
| 4,554,446 A | 11/1985 | Murphy et al. |
| 4,567,609 A | 1/1986 | Metcalf |
| 4,574,947 A | 3/1986 | Hutchings |
| 4,598,378 A | 7/1986 | Giacomo |
| 4,603,390 A | 7/1986 | Mehdipour et al. |
| 4,639,875 A | 1/1987 | Abraham et al. |
| 4,654,800 A | 3/1987 | Hayashi et al. |
| 4,669,730 A | 6/1987 | Small |
| 4,677,553 A | 6/1987 | Roberts et al. |
| 4,679,150 A | 7/1987 | Hayashi et al. |
| 4,689,742 A | 8/1987 | Troy et al. |
| 4,703,423 A | 10/1987 | Bado et al. |
| 4,723,212 A | 2/1988 | Mindrum et al. |
| 4,734,858 A | 3/1988 | Schlafly |
| 4,736,096 A | 4/1988 | Ushikubo |
| 4,737,910 A | 4/1988 | Kimbrow |
| 4,743,022 A | 5/1988 | Wood |
| 4,760,247 A | 7/1988 | Keane et al. |
| 4,766,548 A | 8/1988 | Cedrone et al. |
| 4,799,156 A | 1/1989 | Shavit et al. |
| 4,815,741 A | 3/1989 | Small |
| 4,817,166 A | 3/1989 | Gonzalez et al. |
| 4,817,990 A | 4/1989 | Krost |
| 4,825,045 A | 4/1989 | Humble |
| 4,833,607 A | 5/1989 | Dethloff et al. |
| 4,834,231 A | 5/1989 | Awane et al. |
| 4,839,507 A | 6/1989 | May |
| 4,854,590 A | 8/1989 | Jolliff et al. |
| 4,857,840 A | 8/1989 | Lanchais |
| 4,859,838 A | 8/1989 | Okiharu |
| 4,876,592 A | 10/1989 | Von Kohorn |
| 4,878,248 A | 10/1989 | Shyu et al. |
| 4,882,473 A | 11/1989 | Bergeron et al. |
| 4,882,675 A | 11/1989 | Nichtberger et al. |
| 4,899,906 A | 2/1990 | Bella |
| 4,902,880 A | 2/1990 | Garczynski et al. |
| 4,906,828 A | 3/1990 | Halpern |
| 4,908,761 A | 3/1990 | Tai |
| 4,910,672 A | 3/1990 | Off et al. |
| 4,922,435 A | 5/1990 | Cahlander et al. |
| 4,922,522 A | 5/1990 | Scanlon |
| 4,937,853 A | 6/1990 | Brule et al. |
| 4,947,028 A | 8/1990 | Gorog |
| 4,948,174 A | 8/1990 | Thomson et al. |
| 4,963,723 A | 10/1990 | Masada |
| 4,973,952 A | 11/1990 | Malec et al. |
| 4,982,337 A | 1/1991 | Burr et al. |
| 4,982,346 A | 1/1991 | Girouard et al. |
| 4,992,940 A | 2/1991 | Dworkin |
| 4,993,714 A | 2/1991 | Golightly |
| 4,999,763 A | 3/1991 | Ousborne |
| 5,010,485 A | 4/1991 | Bigari |
| 5,025,372 A | 6/1991 | Burton et al. |
| 5,029,098 A | 7/1991 | Levasseur |
| 5,034,739 A | 7/1991 | Gruhl |
| 5,039,848 A | 8/1991 | Stoken |
| 5,056,019 A | 10/1991 | Schultz et al. |
| 5,058,044 A | 10/1991 | Stewart et al. |
| 5,064,999 A | 11/1991 | Okamoto et al. |
| 5,081,685 A | 1/1992 | Jones, III et al. |
| 5,091,713 A | 2/1992 | Horne et al. |
| 5,117,354 A | 5/1992 | Long et al. |
| 5,117,407 A | 5/1992 | Vogel |
| 5,119,295 A | 6/1992 | Kapur |
| 5,121,945 A | 6/1992 | Thomson et al. |
| 5,128,862 A | 7/1992 | Mueller |
| 5,132,914 A | 7/1992 | Cahlander et al. |
| 5,136,658 A | 8/1992 | Mori |
| 5,172,328 A | 12/1992 | Cahlander et al. |
| 5,173,851 A | 12/1992 | Off et al. |
| 5,176,224 A | 1/1993 | Spector |
| 5,177,342 A | 1/1993 | Adams |
| 5,185,695 A | 2/1993 | Pruchnicki |
| 5,189,607 A | 2/1993 | Shirasaki et al. |
| 5,191,410 A | 3/1993 | McCalley et al. |
| 5,191,525 A | 3/1993 | LeBrun et al. |
| 5,192,854 A | 3/1993 | Counts |
| 5,193,648 A | 3/1993 | Yuter |
| 5,201,010 A | 4/1993 | Deaton et al. |
| 5,202,826 A | 4/1993 | McCarthy |
| 5,204,675 A | 4/1993 | Sekine |
| 5,216,595 A | 6/1993 | Protheroe |
| 5,223,698 A | 6/1993 | Kapur |
| 5,231,569 A | 7/1993 | Myatt et al. |
| 5,239,165 A | 8/1993 | Novak |
| 5,243,515 A | 9/1993 | Lee |
| 5,245,533 A | 9/1993 | Marshall |
| 5,253,165 A | 10/1993 | Leiseca et al. |
| 5,256,863 A | 10/1993 | Ferguson et al. |
| 5,257,179 A | 10/1993 | DeMar |
| 5,262,941 A | 11/1993 | Saladin et al. |
| 5,267,452 A | 12/1993 | Zinsmeyer et al. |
| 5,274,547 A | 12/1993 | Zoffel et al. |
| 5,283,731 A | 2/1994 | Lalonde et al. |
| 5,287,268 A | 2/1994 | McCarthy |
| 5,297,026 A | 3/1994 | Hoffman |
| 5,297,031 A | 3/1994 | Gutterman et al. |
| 5,302,811 A | 4/1994 | Fukatsu |
| 5,305,195 A | 4/1994 | Murphy |
| 5,309,355 A | 5/1994 | Lockwood |
| 5,315,093 A | 5/1994 | Stewart |
| 5,315,664 A | 5/1994 | Kumagai |
| 5,319,542 A | 6/1994 | King, Jr. et al. |
| 5,325,291 A | 6/1994 | Garrett et al. |
| 5,326,959 A | 7/1994 | Perazza |
| 5,339,250 A | 8/1994 | Durbin |
| 5,344,144 A | 9/1994 | Canon |
| 5,353,218 A | 10/1994 | De Lapa et al. |
| 5,353,219 A | 10/1994 | Mueller et al. |
| 5,367,450 A | 11/1994 | Pintsov |
| 5,367,452 A | 11/1994 | Gallery et al. |
| 5,371,796 A | 12/1994 | Avarne |
| 5,380,991 A | 1/1995 | Valencia et al. |
| 5,381,155 A | 1/1995 | Gerber |
| 5,383,111 A | 1/1995 | Homma et al. |
| 5,398,932 A | 3/1995 | Eberhardt et al. |
| RE34,915 E | 4/1995 | Nichtberger et al. |
| 5,408,417 A | 4/1995 | Wilder |
| 5,420,606 A | 5/1995 | Begum et al. |
| 5,422,473 A | 6/1995 | Kamata |
| 5,425,108 A | 6/1995 | Hwang et al. |
| 5,434,394 A | 7/1995 | Roach et al. |
| 5,450,938 A | 9/1995 | Rademacher |
| 5,452,344 A | 9/1995 | Larson |
| 5,458,284 A | 10/1995 | Haan et al. |
| 5,459,306 A | 10/1995 | Stein et al. |
| 5,481,094 A | 1/1996 | Suda |
| 5,482,139 A | 1/1996 | Rivalto |
| 5,495,412 A | 2/1996 | Thiessen |
| 5,504,475 A | 4/1996 | Houdou et al. |
| 5,504,675 A | 4/1996 | Cragun et al. |
| 5,510,979 A | 4/1996 | Moderi et al. |

| | | | | | | |
|---|---|---|---|---|---|---|
| 5,511,646 | A | 4/1996 | Maldanis et al. | 5,739,512 A | 4/1998 | Tognazzini |
| 5,513,102 | A | 4/1996 | Auriemma | 5,754,653 A | 5/1998 | Canfield |
| 5,513,117 | A | 4/1996 | Small | 5,758,328 A | 5/1998 | Giovannoli |
| 5,521,364 | A | 5/1996 | Kimura et al. | 5,761,648 A | 6/1998 | Golden et al. |
| 5,526,257 | A | 6/1996 | Lerner | 5,761,650 A | 6/1998 | Munsil et al. |
| 5,536,045 | A | 7/1996 | Adams | 5,768,142 A | 6/1998 | Jacobs |
| 5,537,314 | A | 7/1996 | Kanter | 5,769,269 A | 6/1998 | Peters |
| 5,539,189 | A | 7/1996 | Wilson | 5,774,868 A | 6/1998 | Cragun et al. |
| 5,544,040 | A | 8/1996 | Gerbaulet | 5,774,870 A | 6/1998 | Storey |
| 5,544,784 | A | 8/1996 | Malaspina | 5,774,874 A | 6/1998 | Veeneman et al. |
| 5,546,316 | A | 8/1996 | Buckley et al. | 5,780,133 A | 7/1998 | Engstrom |
| 5,550,746 | A | 8/1996 | Jacobs | 5,791,991 A | 8/1998 | Small |
| 5,557,721 | A | 9/1996 | Fite et al. | 5,794,207 A | 8/1998 | Walker et al. |
| 5,564,546 | A | 10/1996 | Molbak et al. | 5,799,284 A | 8/1998 | Bourquin |
| 5,568,406 | A | 10/1996 | Gerber | 5,802,015 A | 9/1998 | Rothschild et al. |
| 5,572,653 | A | 11/1996 | DeTemple et al. | 5,806,044 A | 9/1998 | Powell |
| 5,581,064 | A | 12/1996 | Riley et al. | 5,809,144 A | 9/1998 | Sirbu et al. |
| 5,591,972 | A | 1/1997 | Noble et al. | 5,812,769 A | 9/1998 | Graber et al. |
| 5,592,375 | A | 1/1997 | Salmon et al. | 5,816,918 A | 10/1998 | Kelly et al. |
| 5,592,376 | A | 1/1997 | Hodroff | 5,822,216 A | 10/1998 | Satchell, Jr. et al. |
| 5,592,378 | A | 1/1997 | Cameron et al. | 5,822,736 A | 10/1998 | Hartman et al. |
| 5,596,501 | A | 1/1997 | Comer et al. | 5,831,862 A | 11/1998 | Hetrick et al. |
| 5,602,377 | A | 2/1997 | Beller et al. | 5,832,457 A | 11/1998 | O'Brien et al. |
| 5,604,901 | A | 2/1997 | Kelley et al. | 5,832,458 A * | 11/1998 | Jones ........................ 705/14 |
| 5,608,643 | A | 3/1997 | Wichter et al. | 5,842,178 A | 11/1998 | Giovannoli |
| 5,611,051 | A | 3/1997 | Pirelli | 5,842,212 A | 11/1998 | Ballurio et al. |
| 5,611,052 | A | 3/1997 | Dykstra et al. | 5,844,808 A | 12/1998 | Konsmo et al. |
| 5,612,527 | A | 3/1997 | Ovadia | 5,845,259 A * | 12/1998 | West et al. ................... 705/14 |
| 5,612,868 | A | 3/1997 | Off et al. | 5,845,265 A | 12/1998 | Woolston |
| 5,613,620 | A | 3/1997 | Center et al. | 5,848,399 A | 12/1998 | Burke |
| 5,615,269 | A | 3/1997 | Micali | 5,850,446 A | 12/1998 | Berger et al. |
| 5,620,079 | A | 4/1997 | Molbak | 5,855,007 A | 12/1998 | Jovicic et al. |
| 5,621,201 | A | 4/1997 | Langhans et al. | 5,857,175 A | 1/1999 | Day et al. |
| 5,621,640 | A | 4/1997 | Burke | 5,864,604 A | 1/1999 | Moen et al. |
| 5,621,812 | A | 4/1997 | Deaton et al. | 5,864,822 A | 1/1999 | Baker, III |
| 5,630,357 | A | 5/1997 | Akiyama | 5,870,716 A | 2/1999 | Sugiyama et al. |
| 5,631,724 | A | 5/1997 | Sawada et al. | 5,870,717 A | 2/1999 | Wiecha |
| 5,632,010 | A | 5/1997 | Briechle et al. | 5,870,719 A | 2/1999 | Maritzen et al. |
| 5,637,859 | A | 6/1997 | Menoud | 5,873,069 A | 2/1999 | Reuhl et al. |
| 5,638,302 | A | 6/1997 | Gerber | 5,875,110 A | 2/1999 | Jacobs |
| 5,642,484 | A | 6/1997 | Harrison, III et al. | 5,878,139 A | 3/1999 | Rosen |
| 5,642,485 | A | 6/1997 | Deaton et al. | 5,878,401 A | 3/1999 | Joseph |
| 5,644,723 | A | 7/1997 | Deaton et al. | 5,883,810 A | 3/1999 | Franklin et al. |
| 5,649,114 | A | 7/1997 | Deaton et al. | 5,887,271 A | 3/1999 | Powell |
| 5,651,075 | A | 7/1997 | Frazier et al. | 5,890,136 A | 3/1999 | Kipp |
| 5,652,421 | A | 7/1997 | Veeneman | 5,890,718 A | 4/1999 | Byon |
| 5,655,007 | A | 8/1997 | McAllister | 5,905,246 A | 5/1999 | Fajkowski |
| 5,664,115 | A | 9/1997 | Fraser | 5,907,830 A | 5/1999 | Engel et al. |
| 5,665,953 | A | 9/1997 | Mazzamuto et al. | 5,918,213 A | 6/1999 | Bernard et al. |
| 5,666,493 | A | 9/1997 | Wojcik et al. | 5,923,016 A | 7/1999 | Fredregill et al. |
| 5,675,662 | A | 10/1997 | Deaton et al. | 5,924,080 A | 7/1999 | Johnson |
| 5,685,435 | A | 11/1997 | Picioccio et al. | 5,924,082 A | 7/1999 | Silverman et al. |
| 5,687,087 | A | 11/1997 | Taggart | 5,930,145 A | 7/1999 | Yuyama et al. |
| 5,687,322 | A | 11/1997 | Deaton et al. | 5,930,771 A | 7/1999 | Stapp |
| 5,689,100 | A | 11/1997 | Carrithers et al. | 5,937,391 A | 8/1999 | Ikeda et al. |
| 5,692,132 | A | 11/1997 | Hogan | 5,938,717 A | 8/1999 | Dunne et al. |
| 5,701,252 | A | 12/1997 | Facchin et al. | 5,946,665 A | 8/1999 | Suzuki et al. |
| 5,708,782 | A | 1/1998 | Larson et al. | 5,948,038 A | 9/1999 | Daly et al. |
| 5,710,557 | A | 1/1998 | Schuette | 5,956,695 A | 9/1999 | Carrithers et al. |
| 5,710,886 | A | 1/1998 | Christensen et al. | 5,959,869 A | 9/1999 | Miller et al. |
| 5,710,887 | A | 1/1998 | Chelliah et al. | 5,963,452 A | 10/1999 | Etoh et al. |
| 5,713,795 | A | 2/1998 | Kohorn | 5,963,939 A | 10/1999 | McCann et al. |
| 5,717,866 | A | 2/1998 | Naftzger | 5,970,469 A | 10/1999 | Scroggie et al. |
| 5,719,396 | A | 2/1998 | Jack et al. | 5,974,399 A | 10/1999 | Giuliani et al. |
| 5,724,886 | A | 3/1998 | Ewald et al. | 5,988,346 A | 11/1999 | Tedesco et al. |
| 5,726,450 | A | 3/1998 | Peterson | 5,991,740 A | 11/1999 | Messer |
| 5,727,163 | A | 3/1998 | Bezos | 5,995,942 A | 11/1999 | Smith et al. |
| 5,727,164 | A | 3/1998 | Kaye et al. | 5,997,928 A | 12/1999 | Kaish et al. |
| 5,732,398 | A | 3/1998 | Tagawa | 5,999,914 A | 12/1999 | Blinn et al. |
| 5,732,950 | A | 3/1998 | Moody | 6,006,207 A | 12/1999 | Mumick et al. |
| 5,734,150 | A | 3/1998 | Brown et al. | 6,012,834 A | 1/2000 | Dueck et al. |
| 5,734,838 | A | 3/1998 | Robinson et al. | 6,014,634 A | 1/2000 | Scroggie et al. |
| 5,737,710 | A | 4/1998 | Anthonyson | 6,016,504 A | 1/2000 | Arnold et al. |

| | | | | | | | |
|---|---|---|---|---|---|---|---|
| 6,017,157 | A | 1/2000 | Garfinkle | EP | 0 817 138 A1 | | 1/1998 |
| 6,021,394 | A | 2/2000 | Takahashi | EP | 0 856 812 A2 | | 5/1998 |
| 6,026,370 | A | 2/2000 | Jeermyn | EP | 0 862 150 A2 | | 9/1998 |
| 6,026,375 | A | 2/2000 | Hall et al. | GB | 2 109 305 | | 6/1983 |
| 6,029,139 | A | 2/2000 | Cunningham et al. | GB | 2 265 032 A | | 9/1993 |
| 6,029,141 | A | 2/2000 | Bezos et al. | JP | 58132886 | | 8/1983 |
| 6,038,551 | A | 3/2000 | Barlow et al. | JP | 2001093 | A | 1/1990 |
| 6,048,267 | A | 4/2000 | Wichinsky | JP | 2208798 | A | 8/1990 |
| 6,049,777 | A | 4/2000 | Sheena et al. | JP | 4235700 | A | 8/1992 |
| 6,050,568 | A | 4/2000 | Hachquet | JP | 5242363 | A | 9/1993 |
| 6,052,667 | A | 4/2000 | Walker et al. | JP | 6035946 | | 2/1994 |
| 6,055,513 | A | 4/2000 | Katz | JP | 7065218 | A | 3/1995 |
| 6,058,373 | A | 5/2000 | Blinn et al. | JP | 7073375 | | 3/1995 |
| 6,058,375 | A | 5/2000 | Park | JP | 7078274 | | 3/1995 |
| 6,061,660 | A | 5/2000 | Eggelston et al. | JP | 07098779 | A | 4/1995 |
| 6,064,987 | A | 5/2000 | Walker et al. | JP | 07249176 | | 9/1995 |
| 6,070,147 | A | 5/2000 | Harms et al. | JP | 7272012 | | 10/1995 |
| 6,073,840 | A | 6/2000 | Marion | JP | 8030848 | A | 2/1996 |
| 6,076,070 | A | 6/2000 | Stack | JP | 08137951 | | 5/1996 |
| 6,078,866 | A | 6/2000 | Buck et al. | JP | 8-147545 | | 6/1996 |
| 6,085,168 | A | 7/2000 | Mori et al. | JP | 8221484 | | 8/1996 |
| 6,088,682 | A | 7/2000 | Burke | JP | 8221645 | A | 8/1996 |
| 6,101,485 | A | 8/2000 | Fortenberry et al. | JP | 8279007 | | 10/1996 |
| 6,112,191 | A | 8/2000 | Burke | JP | 08329323 | A | 12/1996 |
| 6,115,641 | A | 9/2000 | Brown et al. | JP | 09016836 | A | 1/1997 |
| 6,115,649 | A | 9/2000 | Sakata | JP | 9062908 | A | 3/1997 |
| 6,119,099 | A | 9/2000 | Walker et al. | JP | 9097288 | | 4/1997 |
| 6,131,085 | A | 10/2000 | Rossides | JP | 9190479 | A | 7/1997 |
| 6,134,534 | A | 10/2000 | Walker et al. | JP | 10187820 | | 7/1998 |
| 6,138,105 | A | 10/2000 | Walker et al. | JP | 10214284 | | 8/1998 |
| 6,167,382 | A | 12/2000 | Sparks et al. | JP | 10240830 | | 9/1998 |
| 6,192,349 | B1 | 2/2001 | Husemann et al. | JP | 10269049 | | 10/1998 |
| 6,193,154 | B1 | 2/2001 | Phillips et al. | JP | 11088560 | | 3/1999 |
| 6,193,155 | B1 | 2/2001 | Walker et al. | KR | 9503826 | B | 4/1995 |
| 6,196,458 | B1 | 3/2001 | Walker et al. | WO | WO 95/27242 | | 10/1995 |
| 6,205,435 | B1 | 3/2001 | Biffar | WO | WO96/29668 | | 9/1996 |
| 6,223,163 | B1 | 4/2001 | Van Luchene | WO | WO 96/32701 | | 10/1996 |
| 6,236,971 | B1 | 5/2001 | Stefik et al. | WO | WO96/36926 | | 11/1996 |
| 6,247,047 | B1 | 6/2001 | Wolff | WO | WO 97/08638 | | 3/1997 |
| 6,249,772 | B1 | 6/2001 | Walker et al. | WO | WO9708638 | * | 3/1997 |
| 6,260,024 | B1 | 7/2001 | Shkedy | WO | WO/9708638 | * | 3/1997 |
| 6,266,651 | B1 | 7/2001 | Woolston | WO | WO 97/16797 | | 5/1997 |
| 6,267,670 | B1 | 7/2001 | Walker et al. | WO | WO 97/16897 | | 5/1997 |
| 6,292,786 | B1 | 9/2001 | Deaton et al. | WO | WO 97/20279 | | 6/1997 |
| 6,298,329 | B1 | 10/2001 | Walker et al. | WO | WO 97/21200 | | 6/1997 |
| 6,298,331 | B1 | 10/2001 | Walker et al. | WO | WO 97/23838 | | 7/1997 |
| 6,321,984 | B1 | 11/2001 | McCall et al. | WO | WO97/24680 | | 7/1997 |
| 6,324,520 | B1 | 11/2001 | Walker et al. | WO | WO 97/24701 | | 7/1997 |
| 6,330,544 | B1 | 12/2001 | Walker et al. | WO | WO 97/25684 | | 7/1997 |
| 6,370,513 | B1 | 4/2002 | Kolawa et al. | WO | WO 97/28510 | | 8/1997 |
| 6,405,174 | B1 | 6/2002 | Walker et al. | WO | WO 97/35441 | | 9/1997 |
| 6,512,570 | B2 | 1/2003 | Garfinkle et al. | WO | WO 97/44749 | | 11/1997 |
| 6,584,448 | B1 | 6/2003 | Laor | WO | WO97/46961 | | 12/1997 |
| 6,970,837 | B1 | 11/2005 | Walker et al. | WO | WO 97/50064 | | 12/1997 |
| 7,236,942 | B1 * | 6/2007 | Walker et al. ............ 705/14.65 | WO | WO 98/06050 | | 2/1998 |
| 2001/0013011 | A1 | 8/2001 | Day et al. | WO | WO 98/15907 | | 4/1998 |
| 2001/0014868 | A1 | 8/2001 | Herz et al. | WO | WO 98/19260 | | 5/1998 |
| 2002/0120496 | A1 | 8/2002 | Scroggie et al. | WO | WO 98/21713 | | 5/1998 |
| 2003/0033292 | A1 | 2/2003 | Meisel et al. | WO | WO 98/28699 | | 7/1998 |
| 2003/0088465 | A1 | 5/2003 | Monteverde | WO | WO 98/48388 | | 10/1998 |
| 2003/0139969 | A1 | 7/2003 | Scroggie et al. | WO | WO 98/48563 | | 10/1998 |
| 2004/0243478 | A1 | 12/2004 | Walker et al. | WO | WO 98/49658 | | 11/1998 |
| | | | | WO | WO 99/04326 | | 1/1999 |
| | | FOREIGN PATENT DOCUMENTS | | WO | WO 99/07121 | | 2/1999 |
| | | | | WO | WO 99/09508 | | 2/1999 |
| CA | | 2217739 | 4/1996 | WO | WO 99/12117 A1 | | 3/1999 |
| EP | | 0 085 546 A2 | 8/1983 | WO | WO 99/38125 A1 | | 7/1999 |
| EP | | 0 109 189 | 3/1984 | WO | WO00/75855 | | 12/2000 |
| EP | | 0 512 509 A2 | 11/1992 | | | | |
| EP | | 512413 | 11/1992 | | | | |
| EP | | 607686 | 7/1994 | | | | |
| EP | | 0 779 587 A2 | 9/1996 | | | | |
| EP | | 0 779 587 A3 | 9/1996 | | | | |

OTHER PUBLICATIONS

"My Auto Broker—Online Auto Broker", (http://www.adverlink.com/myautobroker/), download date: May 28, 1997, 4 pp.

Hilts, Paul, "Technology meets commerce; electronic publishing; includes articles on the World Wide Web and the annual Military Book Show; ABA '96", Publisher's Weekly, vol. 243; No. 28; p. 43; ISSN: 0000-0019, 4 pp.

"About CyberSlice", (http://www.cyberslice.com/cgi-bin/WebObjects/CyberSlice:2@httpserv01/), download date: May 6, 1997, 2 pp.

"PriceWatch", (http://icon.co.za/-robo/prodOl.htm), Jan. 14, 1997, 5 pp.

PCT International Search Report for Application No. PCT/US97/13588, dated Dec. 4, 1997,2pp.

Anthony Joseph, "Baby the engine, and other saving tips", The Christian Science Monitor, Nov. 4, 1986, p. B10, 3 pp.

"Coupons & more", welcome to coolsavings.com—Copyright 1996-1999.(http://208,134.230.42/cgi-win/tempprs.exe/first.htm), 3 pp.

"A personal shopping organizer for the web savvy consumer. My KillerApp offers a personalized shopping experience to meet the unique needs of every individual user". (http://www.killerapp.com/html/main/pr0004.html), Oct. 2, 1998, 2 pp.

"SaveSmart—How SaveSmart Works for Consumers"; (http:// s avesmart.com/consumer/consumerhowitworks.html), Copyright 1998, 7 pp.

"Welcome to Planet U, providers of U-pons—Internet Coupons—Internet Coupons"; (http://www.webcertificate.com:443/webcert/faq-detail.asp), Copyright 1998, 8 pp.

Webcertificate, the perfect gift-giving solution . . . It's quick! It's Easy! It's Secure!; (http://www.webcertificate.com:443/webcert/faq-detial.asp), Copyright 1998, 14 pp.

Shop the Marketplace, 1-800-flowers.com; (http://www.1800flowers.com/flowers/welcome.asp), Copyright 1998, 4 pp.

"The Leader in Internet Shopping Systems for Supermarkets and Drug Stores", groceries online. copyright 1996 Groceries Online, Inc. (http://www.groceries-online.com/), Copyright 1996, 4 pp.

"Brother Industries is pushing ahead with its new PC software . . . ", IDC Japan Report, Aug. 30, 1991, Section: vol. 17, pg. 53, 1 pg.

Maras, Elliot, "1995: downsizing adds costs; new strategies sought", Automatic Merchandiser, Aug. 1996, 13 pp.

Naik, Gautam, "In Digital Dorm, Click on Return for Soda", The Wall Street Journal, Jan. 23, 1997, Section: Online, p. B1, 3 pp.

Shea, Barbara, "Read Fine Print When Comparing Car Rentals", Feb. 9, 1997, St. Louis Post-Dispatch, Section: Travel & Leisure, p. 04T, 2 pp.

Website: "CSH Drink Machine(s)", (http //www csh rit edu/proj/drink html), download date: Jan. 29, 1998, 2 pp.

Desjardins, Doug, "Hollywood's Investment in Online Video Retailer Gets Mixed Reviews", Video Store, Aug. 9, 1998, Section: p. 1, ISSN: 0195-1750, 3 pp.

Website: "FAQ: CSH Coke Machine Information", (http //www cs uu nl/wais/html/na-dir/csh-cokemachine-info html), May 5, 1994, 6 pp.

Stigler, George J., "The Theory of Price", The Macmillan Company, Copyright 1952, pp. 82-94, 214-221, 14 pp.

Bowman, Jr., Ward S., "Tying Arrangements and the Leverage Problem", The Yale Law Journal, Nov. 1957, vol. 67, No. 1, pp. 19-36 (10 pp.).

Stigler, George J., "The Theory of Price", The Macmillan Company, Third Edition, Copyright 1966, 8 pp.

Narasimhan, Chakravarthi, "A Price Discrimination Theory of Coupons", Marketing Science, Spring 1984, vol. 3, No. 2, 20 pp.

Judith Evans, "Who was that masked Cybershopper?; MasterCard-Visa Agreement on Credit Card security may make On-Line commerce fly", The Washington Post, View Related Topics; Feb. 2, 1996, Final Edition; Section: Financial; p. F01, 2 pp.

"First Virtual Holdings Releases Beta Software for Secure Transactions on Microsoft Merchant Server", PR Newswire, Mar. 31, 1997; Section: Financial News, 2 pp.

"Six vendors sign on for early electronic commerce venture", Phillips Business Informaion, Inc. Voice Technology News, Dec. 13, 1994; No. 25, vol. 6; ISSN: 1045-1498, 4 pp.

"The easy, pain-free way to buy or lease your next car", What is autoseek; (http://www.autoseek.com/#what) download date: May 28, 1997, 4 pp.

Nora Lockwood Tooher, "Macy's new gift card gets trial run in Warwick", The Providence Journal-Bulletin; Oct. 1, 1998; Section: Business; p. 1E, 2 pp.

Denise Caruso, "Digital Commerce; The boom in on-line shopping adds a twist to the old quandary of how to tax interstate purchases", The New York Times, View Related Topics, Dec. 28, 1998; Late Edition—Final; Section: C; p. 3; col. 5; Business/Financial Desk, 3 pp.

Godwin, Nadine, "New software was key lure in $17 million agency buyout.", Travel Weekly, Nov. 26, 1984, Section: vol. 43, pg. 45, ISSN: 0041-2082, 4 pp.

"Woodside Management Systems Inc. today announced . . . ", PR Newswire, Apr. 1, 1986, 2 pp.

Tellis, Gerard J., "Beyond the Many Faces of Price: An Integration of Pricing Strategies", Journal of Marketing, Oct. 1986, vol. 50, pp. 146-160, 15 pp.

Godwin, Nadine, "Agency, funded by 3M, set to market software; Travelmation touts trip planner to corporations; designed to eliminate client-agent telephone calls; Business Travel Update", Travel Weekly, Oct. 13, 1986, Section: vol. 45, p. 45, ISSN: 0041-2082, 4 pp.

Godwin, Nadine, "Agency dares to launch its own air res system; Travelmation system provides greater versatility, Automation Report", Travel Weekly, Oct. 23, 1986, 5 pp.

"Thomas Cook Travel U.S.A. has announced . . . ", PR Newswire, Jan. 12, 1987, 2 pp.

Bawa, Kapil et al., "The Coupon-Prone Consumer: some Findings Based on Purchase Behavior Across Product Classes", Journal of Marketing, Oct. 1987, vol. 51, pp. 99-110, 12 pp.

Nomani Sr., A., "Air Crashes Stir Signs of Anxiety in Travelers", Wall Street Journal, Aug. 1, 1989, Section 2, p. 1, col. 1, 2 pp.

Carlsen, Clifford, "From Airline Tickets to Human Organs, the Electronic Markets are Booming", San Francisco Business Times, Aug. 14, 1989, Section: vol. 3, No. 50, Section 1, p. 17, 2 pp.

Kuttner, Robert, "Computers May Turn the World into One Big commodities Pit.", Business Week, Sep. 11, 1989, Section: Economic Viewpoint, No. 3123, p. 17, 3 pp.

Golden, Fran, "AAL's Riga doubts Marketel's appeal to retailers", Travel Weekly, Nov. 13, 1989, Section: vol. 48, No. 91, pg. 4, ISSN: 0041-2082, 2 pp.

Del Rosso, Laura, "Firm proposes ticket-bidding system; Marketel explores electronic auction of travel; Marketel International", Travel Weekly, Nov. 13, 1989, Section: No. 91, vol. 48, pg. 1, ISSN: 0041-2082, 3 pp.

"Letters to BusinessExtra", The San Francisco Chronicle, Dec. 26, 1989, Section: Business, C7, 3 pp.

Wallace, David, "Company Planning to Let Flyers bid on Airfares", Philadelphia Business Journal, Mar. 26, 1990, Section: vol. 9, No. 3, Section 1, p. 15, 3 pp.

Greenberg, Peter S., "The Savvy Traveler: Lower Air Fares for Consumers Not in the Cards . . . " Los Angeles Times, Jul. 8, 1990, Section: Travel, Part L, pg. 2, Col. 1, Travel Peak, 2 pp.

Carey, Christopher, "Firm Offers Auction for Airline Tickets", St. Louis Post-Dispatch, Aug. 7, 1991, Section: Business, p. 1B, 2 pp.

Pelline, Jeff, "Travelers Bidding on Airline Tickets SF firm offers chance for cut-rate fares", The San Francisco Chronicle, Aug. 19, 1991, Section: News, p. A4, 4 pp.

Upton, Kim, "News and Briefs: French Say Monoliths Off-Limits to Visitors", Los Angeles Times, Aug. 25, 1991, Section: Travel, Part L, p. 4, Col. 1, Travel Desk, 2pp.

"Buy Low, Fly High", USA Today, Nov. 14, 1991, Section: Bonus, p. 15, 2 pp.

Feldman, Joan M., "To rein in those CRSs; computer reservation systems" Air Transport World, Dec. 1991, Section: vol. 28, No. 12, pg. 89, ISSN: 0002-2543, 5 pp.

"Traveler's Notes; Bookit Report", Consumers Reports Travel Letter, Dec. 1991, Section: vol. 7, No. 12, p. 143, 1 pg.

"CRTL's Blue Ribbon Deals for 1992", Consumer Reports Travel Letter, Jan. 1992, Section: vol. 8, No. 1, pp. 3-5, 2 pp.

"Newsletters", The Atlanta Journal and Constitution, Mar. 1, 1992, Section: Travel: Section K, p. 13, 1 pg.

Del Rosso, Laura, "Ticket-bidding firm closes its doors, Marketel International", Travel Weekly, Mar. 12, 1992, Section: vol. 51, No. 21, pg. 1, ISSN: 0041-2082, 2 pp.

Hainer, Cathy et al., "Where vacationing kids get good care", USA Today, Apr. 1, 1992, Section: Life, p. 4D, 2 pp.

Weatherford, Lawrence R. and Bodily, Samuel E., "A Taxonomy and Research Overview of Perishable-Asset Revenue Management: Yield Management, Overbooking, and Pricing", Operations Research, Sep.-Oct. 1992, vol. 40, No. 5, pp. 831-844, 14 pp.

Spencer, Milton H. and Amos, Jr., Orley M., "Contemporary Economics, Eight Edition", Worth Publishers, Copyright 1993, 5 pp.

Rajendran, K.N. and Tellis, Gerard J., "Contextual and Temporal Components of Reference Price", Journal of Marketing, Jan. 1994, 13 pp.

Feldman, Joan M., "Reclaiming control; new software to close gap between projected and actual revenues", Aug. 1995, Section: vol. 32, No. 8, pg. 35, ISSN: 0002-2543, 5 pp.

*United Sates v. Eastman Kodak Co.*, United States Court of Appeals for the Second Circuit, decided Aug. 4, 1995, 16 pp.

Bronnenberg, Bart J., "Limited Choice Sets, Local Price Response, and Implied Measures of Price Competition", Journal of Marketing Research, Spring 1996, Section: vol. XXXIII, 20 pp.

Prentice, Michael, "Searching for the lowest fare: Getting the lowest fare takes work, but it's worth the effort", The Ottawa Citizen, Oct. 9, 1996, Section: Citylife; Consuming Passion, pg. C3, 3 pp.

"Auctioning unsold airline tickets", Insight (USA), download date: Oct. 29, 1996, 1 pg.

"Web Ventures presents Bookit!", (http www webventures com/bookit), Copyright 1996, 1 pg.

"Salomon Brother's Maldutis Says Internet is Aviation's 'Third Revolution;' Will Earn Billions", World Airline News, Mar. 21, 1997, Section: vol. 7, No. 12, 2 pp.

Feldman, Joan M., "Pricing and cybersales; Internet airline ticket sales and reservations", Feb. 1998, Section: No. 2, vol. 35, pg. 64, ISSN: 0002-2543, 4 pp.

Adyanthaya, Surain, "Revenue Management: the Black Art." Interavia Business & Technology, Sep. 1998, Section: No. 623, vol. 53, pg. 43, ISSN: 0983-1592, 4 pp.

"Airfare Bargains on the Net: About E-mail Lists", (http //travel epicurious com/travel/c_planning/02_airfares/email/intro html), Copyright 1998, 17 pp.

"Airtech—FlightPass Faq", (http //www airtech com/at_flightpass/at_faqflightpass htm), download date: Oct. 5, 1998, 4 pp.

Woolley, Scott, "I got it cheaper than you", Forbes, Nov. 2, 1998, Section: Management, Strategies, Trends, p. 82, 4 pp.

Varian, Hal R., "First Monday: Differential Pricing and Efficiency", (http www firstmonday dk/issues/issue2/different/), Copyright 1996, 18 pp.

Kephart, Jeff, "Price Dynamics of Vertically; Introduction", (http //www research ibm com/infoecon . . . ), Aug. 15, 1998, 3 pp.

"Bookit Airfare Bidding System (Fax for Your Plane Ticket?)", Consumer Reports Travel Letter, Sep. 1991, Section: vol. 7, No. 9, pp. 97, 106, 3 pp.

Nelson, Janet, "Practical Traveler; Airlines Relaxing Policy On No-Refund Tickets", The New York Times, Sep. 22, 1991, Section 5, p. 3, col. 1, Travel Desk, 4 pp.

"Traveler's Notes; Easier Airfare Bidding.", Consumer Reports Travel Letter, Oct. 1991, Section: vol. 7, No. 10, p. 119, 1 pg.

Website: VendMaster, "Windows for Vending PRO with Inventory", (http //www vendmaster com/pro_inv_main html), download date: Jul. 16, 1998, 2 pp.

Website: Optimum Energy Group—Products, "VendingMi$er", (http //www optimumenergy com/products/miser html), download date: Aug. 12, 1998, 2 pp.

Burke, Raymond R., "Virtual Shopping: Breakthrough in Marketing Research", Harvard Business Review, Mar.-Apr. 1996, pp. 120-131, 9 pp.

Website: VendMaster, "Products; Windows for Vending", (http //www vendmaster com/products_main html), download date: Jul. 16, 1998, 2 pp.

PCT International Search Report for Application No. PCT/NO95/00060, dated Oct. 10, 1995, 3 pp.

Rehayem, Gilbert, "Opinion: X-Press Betting", La Fleur's Lottery World, Feb. 7, 1997, 1 pg.

"Cape Town", Reuters Ltd, Nov. 8, 1979, PM Cycle, 1 pg.

"Save the mark", Financial Times (London), Feb. 1, 1983, Section I, Men & Matters at p. 12, 1 pg.

"POS spectrum: a lottery looks to POS for growth", UMI, Inc., POS News, Jan. 1989, vol. 5, No. 7, p. 8, ISSN: 0896-6230, CODEN: BHORAD, 1 pg.

"Let's Play the Cash Register Receipts Lottery", The New York Times, Dec. 25, 1990, Section 1, p. 30, col. 4, Editorial Desk, 1 pg.

Schrage, Michael, "An Experiment in Economic Theory; Labs Testing Real Markets", The Record, Nov. 26, 1989, Section: Business at p. B01, 1 pg.

Nakayama, Atsushi, "Coca-Cola machines to be 'smarter'; the Teleterminal control system is aimed at keeping customers, and machines, satisfied", The Japan Economic Journal, Feb. 23, 1991, Section: Industry: Chemicals, 2 pp.

Del Rosso, Laura, "Marketel says it plans to launch air fare 'auction' in June; Marketel International Inc.", Travel Weekly, Apr. 29, 1991, Section: vol. 50, No. 34, Pg. 1, ISSN: 0041-2082, 3 pp.

"Philips offers customers financing through Citicorp; Philips Medical Systems North America, Citicorp North America Inc." Health Industry Today, Jun. 1991, Section: vol. 54, No. 6, p. 4, ISSN: 0745-4678, 1 pg.

"Coupons get serious; supermarkets use barcodes to prevent misredemptions", Chain Store Age Executive with Shopping Center Age, Oct. 1992, Section: vol. 68, No. 10, p. 68, ISSN: 0193-1199, 2 pp.

"Winn-Dixie/The Salvation Army Report Contributions For War Against Hunger", PR Newswire, Jun. 10, 1993, Section: Financial News, 1 pg.

Jones, Jeanne, "Data Readers Streamline Management; Scanner Technology Aids Retailers As Well As Plants, Wholesalers", The Houston Post, Jun. 26, 1994, Section: Business at p. D1, 4 pp.

Fiorini, Phillip, "'No Place for Penny?'/Smallest coin doesn't make cents to some", USA Today, Jul. 29, 1994, Section: News at p. 1A, 3 pp.

Smith, Alison, "Survey of UK Consumer Credit and Asset Finance", Financial Times, Nov. 3, 1994, 3 pp.

Andreoli, Tom et al., "Cash Machines Offer A Whole Lotto Money For Withdrawl; An Unfortunate Juxtaposition; Block That Metaphor!; Something Street Talk; Fishy In Springfiled; State Street Sears?; Champion As Underdog; A 'Whole Language' Graduate", Crain's Chicago Business, Jun. 19, 1995, 2 pp.

"Spain: BBV launches new card", Cards International, Jun. 22, 1995, 1 pg.

Greene, Jan, "Farm bills please assns; National Grocers Association", Supermarket News, vol. 35, Dec. 23, 1985, 1 pg.

Knippenberg, Jim, "Will local radio empires strike back?", The Cincinnati Enquirer, Jul. 23, 1995, Section: Tempo at p. F01, 1 pg.

Brochure, "Cyber Bid", Net Fun Ltd., Copyright 1996, 9 pg.

Maras, Elliot, "Software opens doors to scientific machine menuing", Automatic Merchandiser, Feb. 1996, p. 36, ISSN: 0002-7545, 5 pp.

Hadley, Kimberly, "Pastors praying anti-arson effort will burn bias", The Nashville Banner, Jul. 26, 1996, Section: News at p. A13, 1 pg.

Gapper, John, "NatWest reports rise in bad debt", Financial Times, Jul. 31, 1996, Section: News: UK, 1 pg.

Gilbert, Allan Z., "A call to action for wireless data communication", Automatic Merchandiser, Aug. 1996, Financial Management section, 3 pp.

"Lynx Technology: Lynx to provide business leasing programm through Schroder Leasing", M2 Presswire, Aug. 9, 1996, 2 pp.

Brochure, "For the Crew & the Customer: The Best Drive-Thru & Grill Service", Olivetti North America, Winter 1998, 2 pp.

"VendMaster: Windows and Vending Software, Reports", (http //www vendmaster com/reports_main html), download date: Feb. 6, 1998, 12 pp.

Taylor, Paul, "Towards a dream market", Financial Times (London), Sep. 4, 1996, Section: Survey—FT IT, 2 pp.

Singletary, Michelle, "Electronic World, Unchecked Problem? U.S. Move to Paperless Payments Raises Worries About Those Who Don't Use Banks", The Washington Post, Mar. 4, 1997, Section: Financial, 4 pp.

Hirschfeld, David, "Increasing Profits Through Automation", Independent Vendors Association Quarterly, Apr./May/Jun. 1997, 10 pp.

"Avco Financial Services", National Home Furnishing Association, (http //www homefurnish comNHFA/avco htm), download date: May 23, 1997, 2 pp.

Website, "Catalina Marketing Corporation", (http //catalinamktg com/prodcdir htm), Copyright 1997, 17 pp.

Riordan, Teresa, "Patents; A novel approach to making a better spermicide harks back to some old-fashioned methods", The New York Times, Jun. 9, 1997, Section D, p. 2, col. 1, Business/Financial Desk, 3 pp.

Nairn, Geoff, "The key to your identity: Falling costs will allow fingerprint verification to be widely used, reports Geoff Nairn", Financial Times (London), Jul. 15, 1997, Section: Technology; at p. 12, 3 pp.

"The United Computer Exchange, How It All Works", (http //www uce com/howitworks html), Copyright 1995-1997, 6 pp.

"Classified 2000: The Internet Classifieds", Classifieds2000, Inc., (http //www classifieds2000 com/cgi-cls/Display exe?C2K+aboutus), Copyright 1996-1997, 3 pp.

"General trading information and terms provided by tradingfloor. com", (http //www tradingfloor com/info htm), Oct. 22, 1996, 11 pp.

"NASDAQ", Information Sheet, (http //home axford com/corfin/corfll htm), download date: Aug. 15, 1997, 3 pp.

Gilbert, Allan Z., "Operators can gain with creative merchandising", Automatic Merchandiser, Oct. 1992, pg. 80, ISSN: 1061-1797, 3 pp.

"Public Internet Kiosks, Inc. Receives First Order for Its 'Internet Station'—The Vending Machine of the Future", PR Newswire, Sep. 16, 1996, 2 pp.

French, Simone A. et al., "A Pricing Strategy to Promote Low-Fat Snack Choices through Vending Machines", American Journal of Public Health, May 1997, vol. 87, No. 5, 3 pp.

Kohda, Youji, Endo, Susumu, "Ubiquitous Advertising on the WWW: Merging Advertisement on the Browser", Computer Networks and SDN Systems 28, May 1, 1996 at pp. 1493-1499, 8 pp.

"Coupon acceptor; Coinco", Beverage Industry, Jul. 1998, No. 7, vol. 89, pg. 38, 2 pp.

"Coinco offers BA-30 dollar bill acceptor", Automatic Merchandiser, Aug. 1998, pg. 43, 2 pp.

Rich Karlgaard, "Keep your eyes on the prize", Forbes, Sep. 21, 1998, pg. 43, 3 pp.

"Coupon acceptor", Beverage Industry, Dec. 1998, No. 12, vol. 89, pg. 34, 1 pg.

Tim Davis, "Vending suppliers scurry to meet Coke-mandated vendor communication", Automatic Merchandiser, Aug. 1996, 2 pp.

Conlon et al. "Press 1 for profit." Sales and Marketing Management. Sep. 1998, 6 pp.

PCT International Search Report for Application No. PCT/US98/21216, dated May 4, 1999, 4 pp.

PCT International Search Report for Application No. PCT/US00/13349, dated Nov. 9, 2000, 4 pp.

PCT International Preliminary Examination Report for Application No. PCT/US00/13349, dated Aug. 30, 2001, 7 pp.

Office Action for Application U.S. Appl. No. 09/348,566, mailed Oct. 1, 2003, 3 pp.

PCT/US 99/21720, Mar. 23, 2000, International Search Report.

Cook, Louise, "ConsumerWatch: Clip, Snip, Save", The Associated Press, Mar. 12, 1984, Business News Section, 2 pp.

"Global, Second-Generation, and Frequent-Buyer Set New Trends", Marketing News, Jun. 7, 1985, vol. 19, No. 12, 1 pg.

Lacher, Lisa, "Coupon Gimmick Registers Profits", Business Dateline, Business Record, Dec. 7, 1987, vol. 83, No. 47, Section 1 at p. 1, 2 pp.

Stevens, Lawrence, "Hypermarket Challenge", Computerworld, Dec. 19, 1988, Section: Software & Services, 2 pp.

McIntyre, Faye, "Small businesses may prefer alternatives to advertising.", South Dakota Business Review, Jun. 1989, 4 pp.

"Safeway Introduces Store-Generated Coupons", PR Newswire, May 1, 1990, 1 pg.

Ramirez, Anthony, "The Pizza Version of Dialing '911'", The New York Times, Sep. 9, 1991, Late Edition—Final, Section D, p. 1, col. 3, Financial Desk, 4 pp.

Blattenberg, Robert C., "Interactive marketing: exploiting the age of addressability.", Sloan Management Review, Sep. 22, 1991, Section: vol. 33, No. 1, 15 pp.

O'Kane, Gerry, "Parking your car by computer", South China Morning Post, Mar. 23, 1993, Section: Supplement 3 pp.

McDowell, Bill, "Frequency marketing builds repeat business; Management", Information Access Company, a Thomson Corporation Company, Reed Publishing USA, Building Supply Home Centers, Aug. 1993, 5 pp.

Arend, Mark, "Debit frenzy? Not quite, but getting there", ABA Banking Journal, Apr. 1994, vol. 86, 4 pp.

Rubel, Chad, "Young firm armed with technology fights an old giant; ETM to Ticketmaster: Let's rock", American Marketing Association, Marketing News TM, Jun. 19, 1995, 3 pp.

"Tecmark Reward Terminal", Tecmark Services, Inc., Copyright 1996, (http //www tecmarkinc com/terminal htm), 1 pg.

McKinney, Jeff, "Merchant program could pay off for Provident", The Cincinnati Enquirer, Mar. 24, 1996, 2 pp.

"Staples The Office Superstore to Participate in Visa 'Rewards for Your Home' Promotion; Savings will be offered to thousands of Visa Staples customers.", Business Wire, Mar. 25, 1996, 2 pp.

Retailers in small N. D. town join forces (Discount Points Corp launches Discount Points, a multi-retailer consumer discount program), Tire Business, Apr. 29, 1996, 3 pp.

Wagner, Jim, "Cameras Tell Mall What Door You Use, How Often You Go", Albuquerque Tribune, Aug. 9, 1996, 2 pp.

Fickenscher, Lisa, "Amex to Start Free Rewards Program with Discounts on Merchandise", The American Banker, Oct. 18, 1996, Section: Credit/Debit/ATMS at p. 10, 2 pp.

Fitzgerald, Kate, "Amex Program Moves Loyalty To Next Level: Custom Extras Finds A Medium Customers Can't Ignore: Billing Statements", Crain Communications Inc., Advertising Age, Nov. 4, 1996, 2 pp.

"Click this box for extra pepperoni; CyberSlice routes online orders", The Dallas Morning News, Dec. 2, 1996, Section: Business at p. 6D, 2 pp.

Bonnici, Joseph et al., "Consumer issues in coupon usage: an exploratory analysis", Journal of Applied Business Research, Winter 1996/1997, vol. 13, No. 1, 12 pp.

"Frequent shopper programs are taking off.", Grocery Marketing, Jan. 1997, vol. 63, No. 1, 2 pp.

Fickenscher, Lisa, "Merchant: American Express Seeks to Mine Its Data on Cardholder Spending Patterns", The American Banker, Mar. 24, 1997, 2 pp.

"Dispensing the future", Lafferty Publications Limited, Electronic Payments International, May 1997, 5 pp.

"Grocery shopping goes on line in many markets; Technology spurs remote ordering concept", The Dallas Morning News, May 12, 1997, 2 pp.

"Industry Briefs", Phillips Business Information, Inc., Card News, Jun. 9, 1997, vol. 12, No. 11, 2 pp.

Popyk, Bob, "Turn customers into torchbearers", Information Access Company, a Thomson Corporation Company, National Trade Publications, Boating Industry, Sep. 1997, No. 9, vol. 60, 3 pp.

Hoeschen, Brad, "Brookfield Square hopes mall card strikes a chord", The Business Journal of Milwaukee Inc., Business Dateline, Business Journal-Milwaukee, Sep. 12, 1997, vol. 14, No. 50, 2 pp.

"Acxiom Case-in-Point Case Study—Bloomingdale's Inc.", "Pushing Technology's Edge Upscale department store applies database for profit", (http //www acxiom com/cip-cs-b htm), download date: Sep. 23, 1997, 3 pp.

"NCR 7452 Workstation—Beyond Traditional POS", (http //www ncr com/product/retail/products/catalog/7452 shtml), download date: Sep. 23, 1997, 3 pp.

"From Our Family to Yours . . . 5 Weeks of Coupon Values for a Valuable Customer", Shoprite, Wakefern Food Corporation, Copyright 1998, 1 pg.

Heller, Al, "Chain Pharmacy: Forecast '98: New Technology Advances Pharmacy Productivity", Lebhar-Friedman Inc., Drug Store News, Jan. 12, 1998, 4 pp.

"Advanced Mechanics Internet Specials", (http //www metroplexweb com/advcpn2 htm), download date: Mar. 12, 1998, 2 pp.

Website: "New Partners, more exciting rewards: The Membership Rewards program for 1998.", (http //www americanexpress com/rewards/news/docs/1998new_mr shtml), download date: Mar. 12, 1998, 38 pp.

Website: "U.P.C. Coupon Code Guidelines Manual", (http //www uc-council org/d31-3 htm), download date: Mar. 12, 1998, 10 pp.

Rubinstein, Ed, "Internet Continues To Fortify Takeout Sector For Operators", Lebhar-Friedman Inc., Nation's Restaurant News, Mar. 23, 1998, 5 pp.

Information Packet: "My Points®—Universal Rewards Currency", MotivationNet, Inc. Apr. 1998, 29 pp.

Hemsley, Steve, "Research and destroy; Point-of-purchase research provides brand managers . . . ", Centaur Communications Ltd., Marketing Week, Apr. 16, 1998, 3 pp.

"WellsPark Group Lauches 'V.I.P. Rewards'; the Most Comprehensive Relationship Marketing Program Ever Created by a Mall Developer", Business Wire, Inc., May 19, 1998, 2 pp.

"Catching Red Light Runners", Business Communications Company, Advanced Transportation Technology News, Jun. 1998, 2 pp.

Amato-McCoy, Deena, "Co-Branded Acme Credit Card Rewards Loyal Users", Information Access Company, A Thomson Corporation Company, Capital Cities Media Inc., Supermarket News, Jun. 15, 1998, 2 pp.

"Acme Markets, U.S. Bancorp Debut visa Rewards Card", Phillips Business Information, Inc., Card News, Jun. 22, 1998, 1 pg.

Rubinstein, Ed, "Technology: Prepaid program lets Galleria guests dine 'a la Card'", Nations's Restaurant News, (http //www nrn com), Jun. 29, 1998, 1 pg.

"DataCard Partners With CSI To Offer Card-Based Loyalty Solution to Merchants", Business Wire, Inc., Jul. 9, 1998, 1 pg.

Albright, Mark, "Grocery savings via Web coupons", Times Publishing Company, St. Petersburg Times, Jul. 22, 1998, Section: Business at p. 1E, 2 pg.

Campos, Frellie, "Discount shopping program extended to residents. ", Pacific Business News, Sep. 21, 1998, 3 pp.

"Garage management needs", "Unit Tracking with The General Manager Professional", (http www dacobusy com/garage/idxgarg htm), download date: Mar. 16, 1999, 2 pp.

"Route Sales Automation—Track customers, orders, sales, and inventory! Route accounting,..", "Point of sale system carried in the palm of your hand", (http //www dacobusy com/), download date: Mar. 16, 1999, 1 pg.

"Alphatech, Inc., Looking to the Future", (http //www alphatech com/), download date: Mar. 25, 1999, 1 pg.

"Alphatech: Technologies and Projects", (http //www alphatech com/secondary/techpro/compvis html), download date: Mar. 25, 1999, 3 pp.

"IMPS: Vehicle License Plate Recognition System", "IMPS ™ Integrated Multi-Pass System State of the Art Vehicle License Plate Recognition System", (http www singapore com/optasia/imps), download date: Mar. 25, 1999, 3 pp.

"MSTAR main", "Moving and Stationary Target Acquisition and Recognition (MSTAR)", (http www alphatech com/secondary/techpro/projects/mstar/MSTAR_TopLevel html), download date: Mar. 25, 1999, 2 pp.

"Welcome to Q Lube!", (http //www qlube com/), download date: Mar. 25, 1999, 1 pg.

Silverman, Gene "Planning and using informercial campaigns effectively", Direct Marketing, Sep. 1995, 3 pp.

Bigger Plans, (Provident bank, issuer of MeritValue customer loyalty card, plans to offer program in 25 cities in six months), CardFax, Oct. 7, 1996, 1 pg.

Quittner, Jeremy, "Ohio's Provident Brings Its Discount Card to Fla.", American Banker, Feb. 11, 1997, 2 pp.

Symons, Allene "Lucky, Sav-on debut Rewards Card", Drug Store News, Feb. 17, 1997, 2 pp.

MasterCard Purchasing Card, www. mastercard com business purchasing card6 download date Feb. 28, 1997, 13 pp.

McKeveny, Alexander, "Giving Them a Good Reason", Bank Marketing, Mar. 1997, 5 pp.

Marketing Q&A #3, Frankie Hollywood's Public Relations Newsletter, Apr. 1-15, 1997, 2 pp.

Myhre, James W., Examiner's Affidavit dated Feb. 22, 2001, 1 pg.

Notice of Allowability for U.S. Appl. No. 09/166,405 mailed Jun. 29, 2001, 5 pp.

Office Action for U.S. Appl. No. 09/166,405 mailed Mar. 8, 2001, 14 pp.

Office Action for U.S. Appl. No. 09/166,405 mailed Sep. 13, 2000, 15 pp.

Notice of Allowance for U.S. Appl. No. 10/118,620 mailed Dec. 16, 2005, 17 pp.

Office Action for U.S. Appl. No. 10/118,620 mailed Apr. 4, 2005, 18 pp.

Office Action for U.S. Appl. No. 10/118,620 mailed Oct. 28, 2004, 15 pp.

Office Action for U.S. Appl. No. 10/118,620 mailed Apr. 13, 2004, 15 pp.

Notice of Allowance for U.S. Appl. No. 11/399,143 mailed Dec. 27, 2007, 7 pp.

Notice of Allowance for U.S. Appl. No. 11/399,143 mailed Jun. 27, 2007, 7 pp.

Office Action for U.S. Appl. No. 11/399,143 mailed Apr. 6, 2006, 10 pp.

Notification of Transmittal of International Preliminary Examination Report for PCT/US/99/22060, Jan. 31, 2001, 11 pp.

Written Opinion for PCT/US99/22060 mailed Sep. 7, 2000, 9 pp.

International Search Report for PCT/US99/22060 mailed Feb. 16, 2000, 3 pp.

Notice of Allowance for U.S. Appl. No. 09/221,099 mailed Feb. 22, 2007, 7 pp.

Notice of Allowance for U.S. Appl. No. 09/221,099 mailed Sep. 6, 2006, 7 pp.

Office Action for U.S. Appl. No. 09/221,099 mailed Jun. 24, 2005, 4 pp.

Office Action for U.S. Appl. No. 09/221,099 mailed Jun. 1, 2004, 7 pp.

Office Action for U.S. Appl. No. 09/221,099 mailed Jan. 22, 2003, 7 pp.

Office Action for U.S. Appl. No. 09/221,099 mailed Mar. 8, 2002, 7 pp.

Office Action for U.S. Appl. No. 09/221,099 mailed Aug. 8, 2001, 7 pp.

Office Action for U.S. Appl. No. 09/221,099 mailed Dec. 18, 2000, 6 pp.

Office Action for U.S. Appl. No. 08/994,426 mailed May 31, 2000, 13 pp.

Office Action for U.S. Appl. No. 08/994,426 mailed Sep. 1, 1999, 18 pp.

Notice of Allowability for U.S. Appl. No. 08/994,426 mailed Jun. 20, 2003, 8 pp.

Notice of Allowability for U.S. Appl. No. 08/994,426 mailed Jun. 20, 2003, 5 pp.

Notice of Allowability for U.S. Appl. No. 08/994,426 mailed May 7, 2002, 4 pp.

Notice of Allowability for U.S. Appl. No. 08/994,426 mailed Mar. 22, 2002, 4 pp.

Notice of Allowability for U.S. Appl. No. 08/994,426 mailed Nov. 28, 2001, 6 pp.

Office Action for U.S. Appl. No. 98/994,426 mailed Feb. 8, 2001, 14 pp.

Office Action for U.S. Appl. No. 10/699,462 mailed Sep. 29, 2009, 6 pp.

Office Action for U.S. Appl. No. 12/111,637 mailed Jul. 21, 2010, 21 pp.

* cited by examiner

PRE-SALE DATA BROADCAST SYSTEM AND METHOD

CROSS-REFERENCE TO RELATED APPLICATIONS

The present application is a continuation of U.S. patent application No. 09/221,099, filed Dec. 28, 1998, entitled "PRE-SALE DATA BROADCAST SYSTEM AND METHOD", which issued as U.S. Pat. No. 7,236,942; which is a continuation-in-part of U.S. patent application No. 08/994,426, entitled "METHOD AND APPARATUS FOR PROVIDING SUPPLEMENTARY PRODUCT SALES TO A CUSTOMER AT A CUSTOMER TERMINAL", filed Dec. 19, 1997 and issued as U.S. Pat. No. 6,694,300 on Feb. 17, 2004; U.S. patent application No. 09/221,099 is also a continuation-in-part of U.S. patent application No. 09/166,405, entitled "METHOD AND APPARATUS FOR DEFINING ROUTING OF CUSTOMERS BETWEEN MERCHANTS," filed Oct. 5, 1998 and issued as U.S. Pat. No. 6,405,174 on Jun. 11, 2002. Each of the above-referenced applications is incorporated by reference herein in its entirety.

FIELD OF THE INVENTION

The present invention relates generally to point-of-sale (POS) systems, and more specifically to POS marketing systems.

BACKGROUND OF THE INVENTION

Cash registers have historically been used by retailers to manage transactions.

Specifically, cash registers perform efficient and accurate tallying and reporting duties. As retailers have begun to increasingly rely on sales data, POS systems have gradually started to replace conventional cash registers. Today, POS systems utilize data for both accounting and marketing purposes.

For example, retailers have used data obtained from a POS system to manage frequent shopper programs. In such programs, customers often carry cards with a machine-readable indicia, such as magnetic stripes or bar codes. The cards identify the customer to the POS system which tracks purchase behavior. The transaction data which can be obtained through the POS system may include one or more of the following: (i) the items an individual purchased, (ii) the frequency at which an individual shops, (iii) an individual's average purchase total, and/or (iv) an individual's coupon redemption behavior. In addition, transaction data can be aggregated to account for regional and demographic behavior such as reactions to sales and promotions. While customers are rewarded for their loyalty, a database of such information is formed.

Product manufacturers have also utilized data collected through POS systems for marketing purposes. Manufacturers use the data to track product performance and the impact of manufacturer promotions, such as coupons and rebates. Manufacturers can benefit from the ability provided by the POS to instantly and directly market to individual customers. For example, many manufacturers profit through many POS couponing services offered by systems such as those disclosed in various including U.S. Pat. Nos. 4,723,212; 4,910,672; 5,173,851; and 5,612,868.

The benefits realized by manufacturers through the use of POS data and current POS marketing techniques are grossly exaggerated, however. Sales data drastically diminishes in value by the time manufacturers have a chance to analyze the data and make decisions on their analysis. Post-sale sales data, at best, can be used to influence a customer's subsequent purchases. For one-time or infrequent purchases, data indicating that a customer purchased a competing brand is relatively useless to a manufacturer in that the customer has already purchased the competitor's product. Furthermore, although prior systems may give customers targeted coupons instantly after a purchase at the POS, this is too late to encourage current consumer behavior because the customer must bring the coupon back to the store at a subsequent visit.

In addition, because coupons and rebates require a further active step in addition to the initial purchase, the effectiveness of such programs is minimal. This deficiency can be attributed to a manufacturer's extremely passive role in such promotions. Coupons are printed, distributed, and left to customers to redeem. Customers, however, often forget to bring such coupons to the store, and often misplace such coupons. Even so-called "coupon-less" frequent shopper card systems require shoppers to carry cards, which are burdensome to carry and are also lost or frequently forgotten. Because coupons suffer low redemption rates, coupons are inevitably a poor vehicle for manufacturers to effectively provide customer value. In addition, rebate offers are often ignored because of the inconvenience to the buyer in redeeming the offer. Ultimately, customers often find rebates valueless because the amount of money to be redeemed can be rather insubstantial compared to the effort and postage required for redemption.

Manufacturers have also historically been limited in their ability to compete with other manufacturers at retail locations. At best, manufacturers can effectively compete by packaging products more attractively and by obtaining better positioned retailer shelf space. Because manufacturers are not actively involved in retail transactions and sales efforts, they miss opportunities to market directly to ready, willing and able buyers at a time when buyers are making purchasing decisions.

SUMMARY OF THE INVENTION

It is an object of the present invention to provide a method and apparatus for more effectively marketing products to consumers.

In accordance with the present invention, manufacturers can market products directly to consumers at the time of purchase. Prior to completing the sale of an original product at a POS terminal, one or more manufacturers can offer comparable substitute products to a customer. As such, customers need not actively seek and/or redeem promotional benefits after a purchase, thereby enhancing manufacturer marketing efforts.

In one embodiment of the present invention, the method for promoting the sale of substitute products includes receiving transaction data regarding an original product presented for purchase by a consumer at a point of sale terminal; determining a substitute product to be offered to the consumer during a transaction session; and offering the substitute product to the consumer before the transaction session terminates. The method of determining the substitute product to be offered to the customer may be based on factors such as product profit margin, product inventory information, product expiration date, retail product price information, product floor price information, product sales information, sale and promotional pricing information, product demand, product forecasts, product class, product pricing, and product features. This method may be carried-out by the manufacturers' servers, retailer's server and/or various POS terminals, as well as other devices.

DETAILED DESCRIPTION OF SEVERAL EMBODIMENTS OF THE PRESENT INVENTION

Figure 1:
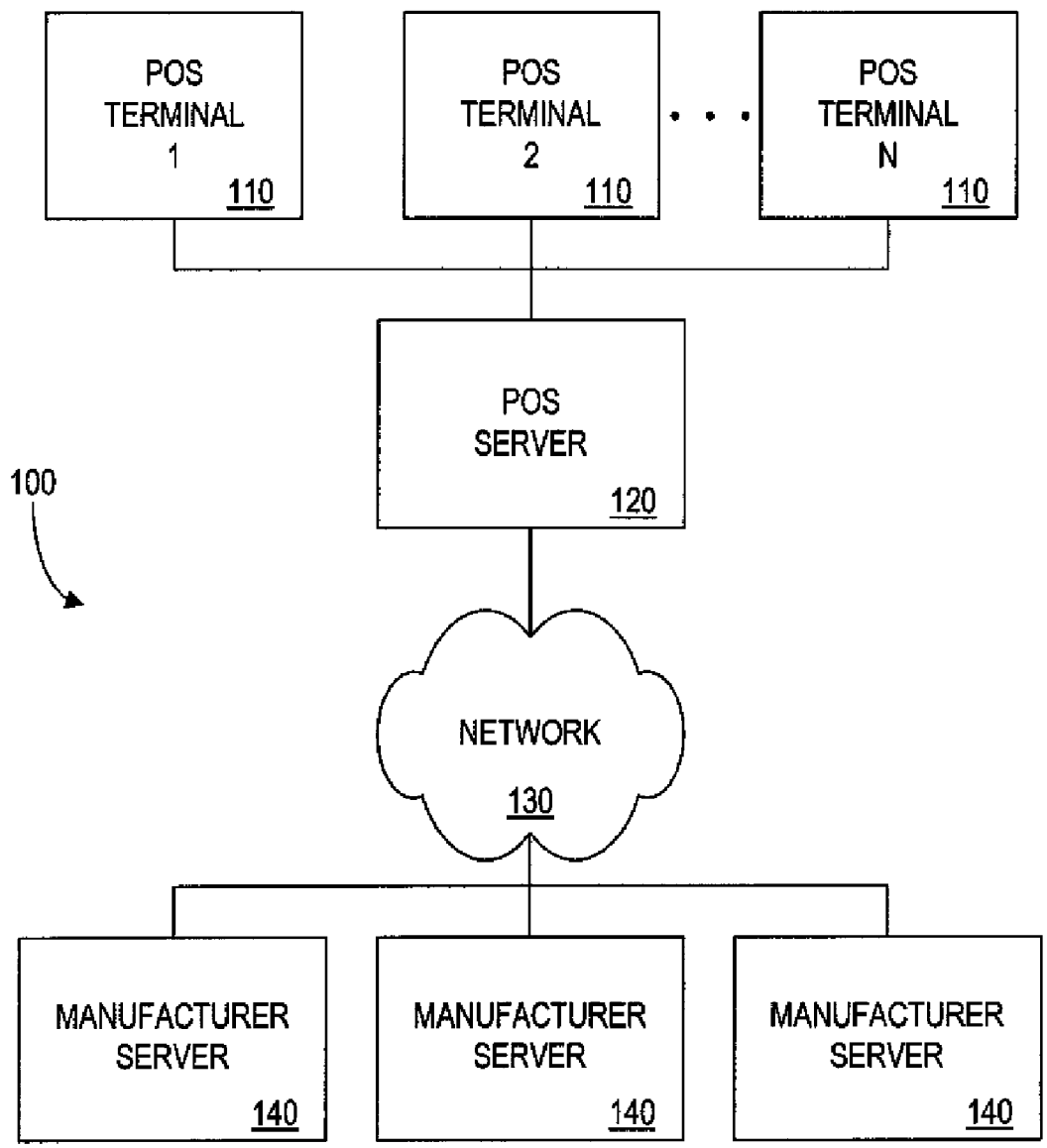
FIG. 1 is a block diagram illustrating an overview of a system in accordance with the present invention.

The present invention provides a POS system configured to actively solicit manufacturer marketing promotions during a sales transaction. As used throughout the application, the term "manufacturer" refers to any product supplier, regardless of whether or not the supplier actually manufactures the end product that is sold through retail channels. By directly marketing to customers at the time of purchase, but prior to consummation of the purchase, manufacturers market directly to customers, thereby enhancing their marketing efforts. Further, since such customers have already indicated their readiness to purchase the product, the manufacturers are assured that their marketing efforts have an increased chance of success. As such, the present invention provides manufacturers a greater opportunity to compete with other manufacturers at retail locations. The present invention also provides a greater opportunity for retailers to accelerate the sale of overstocked, distressed and/or slow-selling merchandise. As such, customers need not actively realize promotional benefits after a purchase, through any form of coupon or rebate redemption.

In various embodiments of the present invention, a central POS server is connected via a communication port to at least one POS terminal and at least one remote manufacturer server. After the initiation of a transaction at a POS terminal, but before consummation of the transaction, the POS server contacts one or more manufacturer servers. The POS server notifies the manufacturer server(s) of a transaction in progress and provides the manufacturer server(s) with transaction data such as product identifiers, customer identifiers, inventory data, or the like. After receiving the transaction data, a manufacturer server may evaluate the data to determine if the customer's product selection best serves the manufacturer's financial interest. If not, the manufacturer server would return a signal to the POS server conveying a promotional offer to encourage the buyer to favorably switch products. For example, the manufacturer may determine that it would be more profitable for the customer to purchase the manufacturer's product rather than a competitor's product. In the alternative, the manufacturer may determine that it would be more profitable if the customer were to purchase a different one of its own products rather than the one the customer has selected. If the customer accepts the offer, the POS terminal voids the sale of the original product from the pending transaction subtotal, adds the substitute product's price to the subtotal, adjusts the price of the substitute product to reflect the manufacturer's discount and completes the sale of the substitute product With reference to the FIGS., various embodiments and exemplary POS terminals, POS servers and manufacturer servers, and their methods of operation, will now be described. The leading number of each reference number used throughout the drawings indicates the first figure in which the reference number is introduced.

With reference to FIG. 1, the overall system 100 of one embodiment of the present invention is shown. In this embodiment, the system 100 includes N number of POS terminals 110, a POS server 120, a network 130 and N number of manufacturer servers 140, each of which will be described in greater detail below.

POS terminals 110 are connected via communication ports to the POS server 120. Although three POS terminals are shown in FIG. 1, it is to be understood that the system 100 may have as few as one POS terminal or as many as N number of POS terminals. Each of the POS terminals 110 includes a card authorization terminal ("CAT"), such as those manufactured by Verifone, Inc., or a similar device for generating data relating to a purchase, such as purchase price, items purchased and other purchase parameters. The POS terminals 110 transmit this generated data to the POS server 120, thereby providing information to the POS server 120 relating to the purchase. The POS server 120 communicates via a network 130, such as the internet, LAN, WAN, or a telephone network, to communicate with one or more manufacturer servers 140. It is to be understood however that the POS server 120 may communicate with the POS terminals 110 and manufacturer servers 140 through other media, such as through wireless communication devices.

Figure 2:
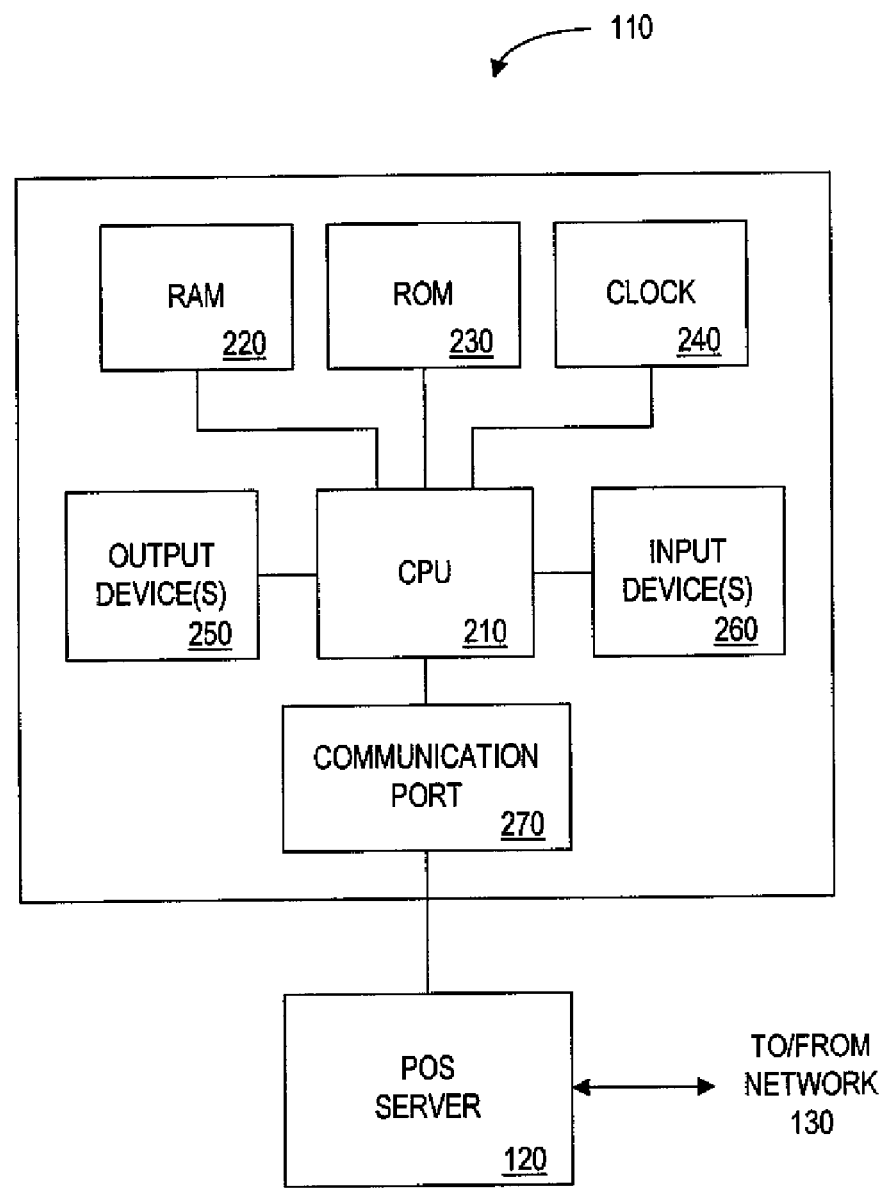
FIG. 2 is a block diagram illustrating an exemplary POS terminal in accordance with the present invention.

With reference to FIG. 2, an exemplary POS terminal 110 is shown. The POS terminal 110 includes a CPU 210, which may contain one or more conventional microprocessors, and is connected to a RAM 220, ROM 230, clock 240, one or more output device(s) 250, one or more input device(s) 260, and a communications port 270 for communicating with the POS server 120. Output devices 250 may include devices such as LCD displays, LED displays, CRT terminals, and printers, among other devices. The input devices 260 may include a keyboard, cardreaders, and touch screen devices, among others.

Figure 3:
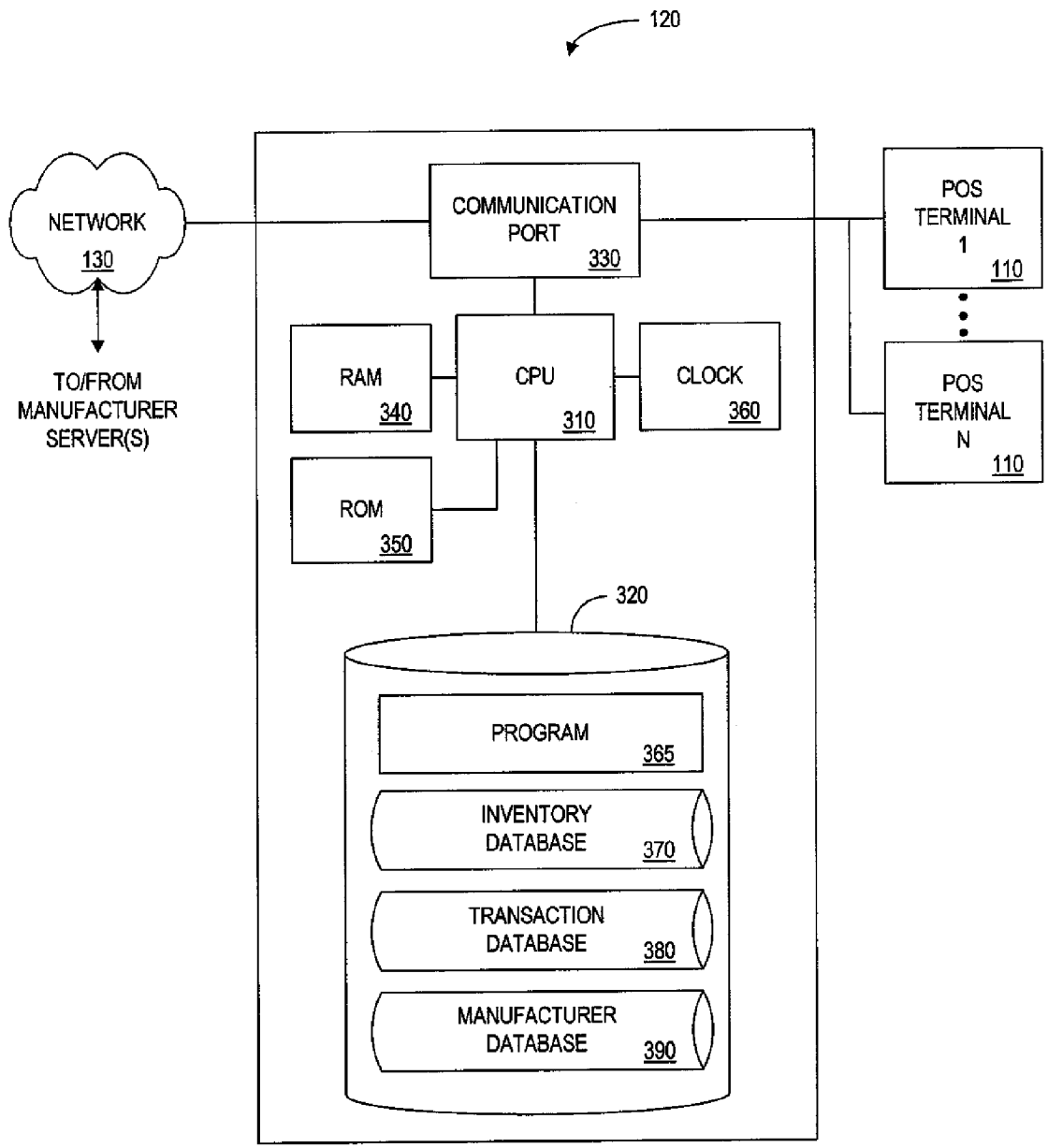
FIG. 3 is a block diagram illustrating an exemplary POS server in accordance with the present invention.

With reference to FIG. 3, a schematic block diagram of an exemplary POS server 120 is shown. The POS server 120 includes a CPU 310, which may contain one or more conventional microprocessors, and a data storage device 320, which may contain an appropriate combination of magnetic, optical and semiconductor memory devices. The CPU 310 communicates with POS terminals 110 and network 130 via a communication port 330. The CPU 310 and the storage device 320 may be (i) located entirely within a single computer or other computing device; (ii) connected to each other by a remote communication link such as a serial port cable, telephone line or radio frequency transceiver; or (iii) a combination thereof.

The POS server 120 also includes a RAM 340, a ROM 350 and a clock 360 which are disposed in communication with the CPU 310. The storage device 320 stores (i) a program 365 for controlling the CPU 310; (ii) an inventory database 370; (iii) a transaction database 380 and (iv) a manufacturer database 390. The program 365 drives the CPU 310 to operate in accordance with the present invention and with the methods described in detail herein. The program 365 further includes additional program elements that may be necessary, such as "device drivers," for allowing the CPU 310 to interface with other devices.

The inventory database 370 stores information regarding products that the retailer currently has in stock. For example, the inventory database 370 may contain information such as UPC codes, corresponding prices and corresponding available quantities. The inventory database 370 may also be accessed during a conventional transaction to check for prices and update inventory status. In one embodiment of the present invention, the inventory database 370 may be indirectly queried by a manufacturer server to see if a retailer has a sufficient inventory of a particular product for possible selection as an offered substitute product.

In general, it is to be understood that the inventory database 370 may contain a wide array of information for use by the POS server 120 and/or manufacturer servers 140, such as product profit margin information, product inventory information, product expiration date information, retail product price information, product floor price information, product sales information, sale and promotional pricing information, product demand information, product forecast information, product class information, product pricing information, and information regarding product features. Product profit margin information reflects the differences between prices paid by the retailer, and the prices at which products are to be sold by the retailer. Product inventory information reflects the identity and quantity of each of the products in inventory. This information may indicate inventory at a particular location, within a particular geographic region and/or across all stores of a retailer. Product expiration date information may include expiration dates of perishable items, and/or pre-defined dates which determine when a product is outdated (i.e., when it becomes "last year's" model). Retail product price information includes current prices of products, whether or not in inventory. Product floor price information includes prices of products currently on display at a retailer. Product sales information may include the number and type of products sold over a period of time. Product demand information may also be included to reflect recent product sales rates over a period of time, as well as the number of "rain-checks" issued for particular products. Sale and promotional pricing information may include past, present and likely future sale prices and promotions. Product forecast information may include projections of likely consumer demand for particular products, particularly during specific shopping seasons. Product class information may include general classifications such as "consumer appliance" or "TV," or more specific classification such as "flat screen TV." Specific product feature information may also be included.

The transaction database 380 stores information regarding transactions for later reconciliation with the manufacturer for any promotional discounts, coupons and the like. Such information may include the time of a particular transaction, a frequent shopper ID, product identifiers for substitute products sold, the quantity of substitute products sold, the prices of substitute products sold, manufacturer discounts applied to substitute products (and therefore owed by the manufacturer to the retailer) and UPC data, among other information.

The manufacturer database 390 stores information that is used by the POS server 120 to manage pre-sale data broadcasts to manufacturers. The manufacturer database 390 may contain rules and instructions regarding which manufacturer(s) to contact, as well as when and how to contact the manufacturer(s). For example, the manufacturer database 390 may contain rules to contact only registered manufacturers who have subscribed with a service to receive such information. In such an embodiment, interested manufacturers pay a registration and/or subscription fee to receive information regarding customer purchases, thereby giving the registered manufacturer(s) the opportunity to offer substitute products. In addition, the manufacturer database 390 may contain rules regarding when the manufacturer is to be contacted. For example, a manufacturer may be contacted when a competing product is scanned at a retailer's POS terminal, or when a product having a certain "product class" denoted by the UPC code is scanned. The manufacturer database 390 may also contain rules on how to contact the manufacturer including internet and e-mail addresses, telephone numbers to initiate electronic communication via communication port 330, and the like.

Figure 4:
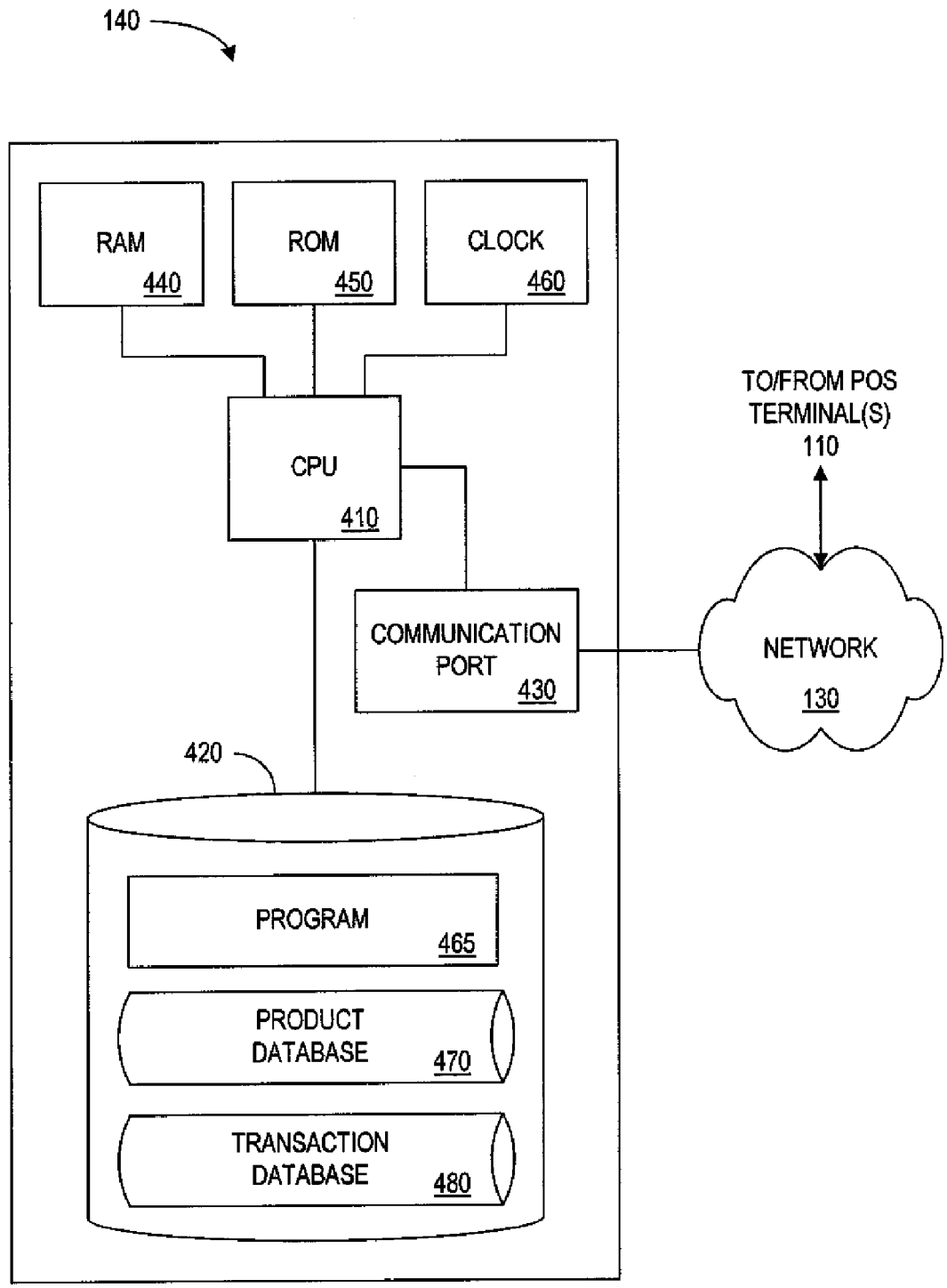
FIG. 4 is a block diagram illustrating an exemplary manufacturer server in accordance with the present invention.

With reference to FIG. 4, a schematic block diagram of an exemplary manufacturer server 140 is shown. The manufacturer server 140 includes a CPU 410, which may contain one or more conventional microprocessors, and a data storage device 420, which may contain an appropriate combination of magnetic, optical and semiconductor memory devices. The CPU 410 communicates with network 130 via a communication port 430. The manufacturer server 140 further includes RAM 440, ROM 450 and a clock 460 which are disposed in communication with CPU 410. Storage device 420 stores (i) a program 465 for controlling the CPU 410; (ii) a product database 470; and (iii) a transaction database 480. The CPU 410 and the storage device 420 may be (i) located entirely within a single computer or other computing device; (ii) connected to each other by a remote communication link such as a serial port cable, telephone line or radio frequency transceiver; or (iii) a combination thereof.

The program 465 drives the CPU 410 to operate in accordance with the present invention and with the methods described in detail herein. The program 465 further includes additional program elements that may be necessary such as device drivers for allowing the processor to interface with other devices.

The product database 470 stores information that is used by the manufacturer server 140 to make decisions on comparable but more profitable substitute products to offer to a customer. The product database 470 may store information such as UPC codes, prices, description of features, price floors, profit margins, and other information. The product database 470 may also include information similar to that found in inventory database 370 of a POS server 120, such as product demand information and product pricing information.

The transaction database 480 stores data relating to all transactions that are made with a retailer POS server 120. As such, information contained within the transaction database 480 may be used for purposes of settlement, reconciliation, reporting, and auditing, among other purposes.

Figure 5A:
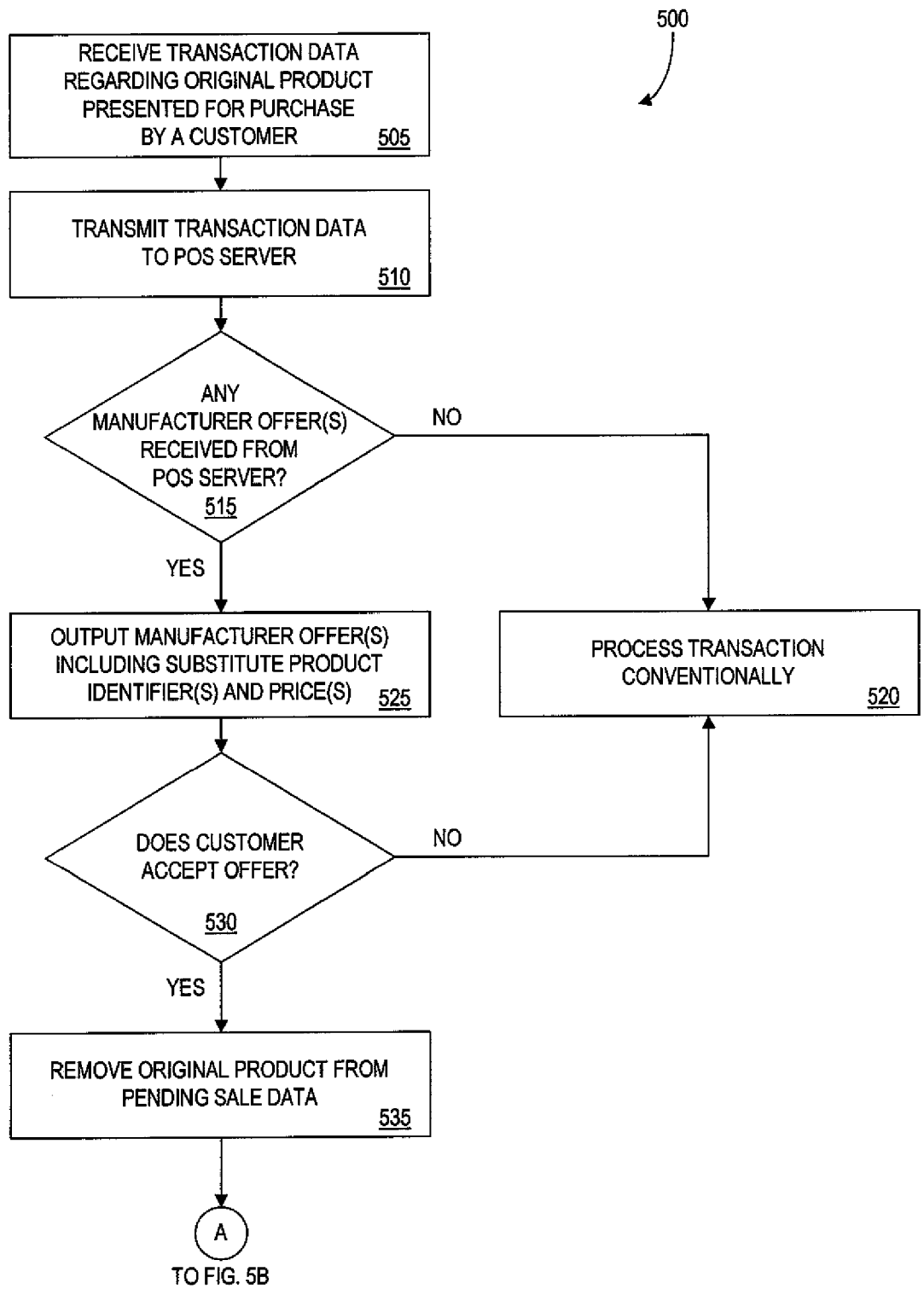
FIGS. 5A and 5B together comprise a flowchart illustrating a process performed by the POS terminal in accordance with one embodiment of the present invention.
Figure 5B:
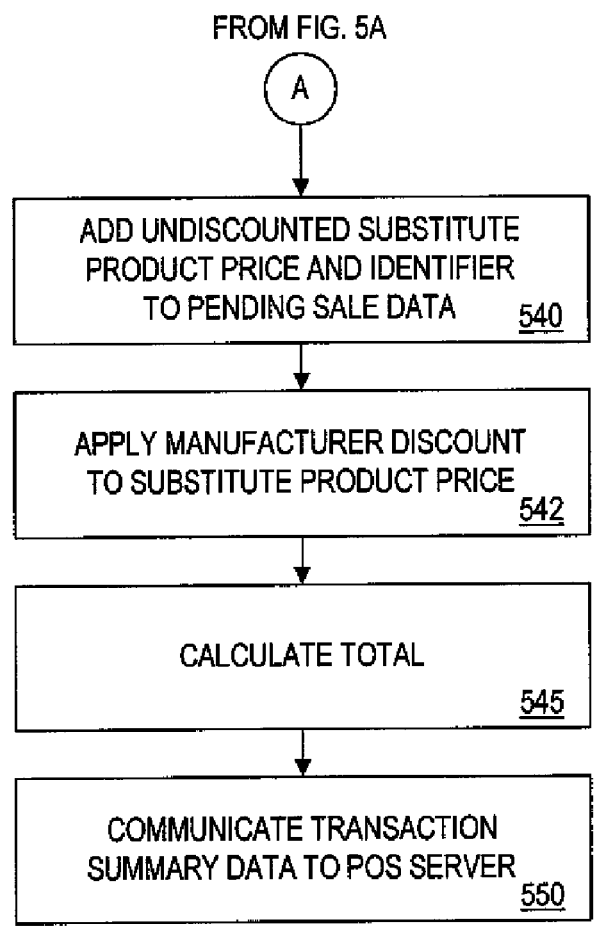

With reference to FIGS. 5A and 5B, a flowchart 500 describing the method performed by the POS terminal 110 in various embodiments of the present invention is shown. The illustrated method is performed after a customer has presented a product for purchase at a retailer's POS terminal 110.

Transaction data which represents a customer's product selection is first received by the POS terminal 110 (step 505). This data may be entered manually by an employee of the retailer, or may be derived from the UPC code of the product selected by the customer. In one embodiment of the invention, original product data is then entered as pending sale data in the POS terminal 110. In an alternate embodiment of the invention, original product data is only entered as pending sale data in the POS terminal 110 if the customer declines a manufacturer's substitute product offer.

The POS terminal 110 transmits the transaction data to the POS server 120 (step 510) and awaits receipt of any manufacturer's offer(s). If no such offer is received from the POS server 120, the sale of the original product is processed and completed conventionally (step 520). If, however, one or more manufacturer offers are received from the POS server 120 (step 515), the one or more manufacturer offers are outputted and communicated to the customer (step 525). Each manufacturer offer includes a substitute product identifier and its corresponding price which are communicated to the customer. The manufacturer offer(s) may be communicated to the customer in any of a variety of ways, including verbal communication by the retailer's sales attendant to the customer, outputting the information to a printer and displaying the information to the customer, or displaying the offer(s) to the POS terminal 110 for viewing by the customer. It is to be understood, however, that other means of communicating the manufacturer offers to the customer may also be used.

If the customer does not accept the offer (step 530), the sale of the original product is conventionally completed (step 520). Upon acceptance of the offer (step 530), the POS terminal 110 removes original product information from pending sale data (step 535), adds the undiscounted substitute product price to the pending sale data (step 540), and applies the manufacturer discount (step 542) to arrive at the price at which the substitute product was offered to the customer. It is to be understood that various alternate techniques may also be used. For example, the POS terminal 110 may receive signal from the POS server 120 to replace the original product data with substitute product data in the pending sale data.

A purchase total is ultimately calculated (step 545), the sales transaction is completed and transaction summary data is communicated to the POS server 120 (step 550). This information is used by the POS server 120 to update the inventory database 370 and the transaction database 380.

Figure 6A:
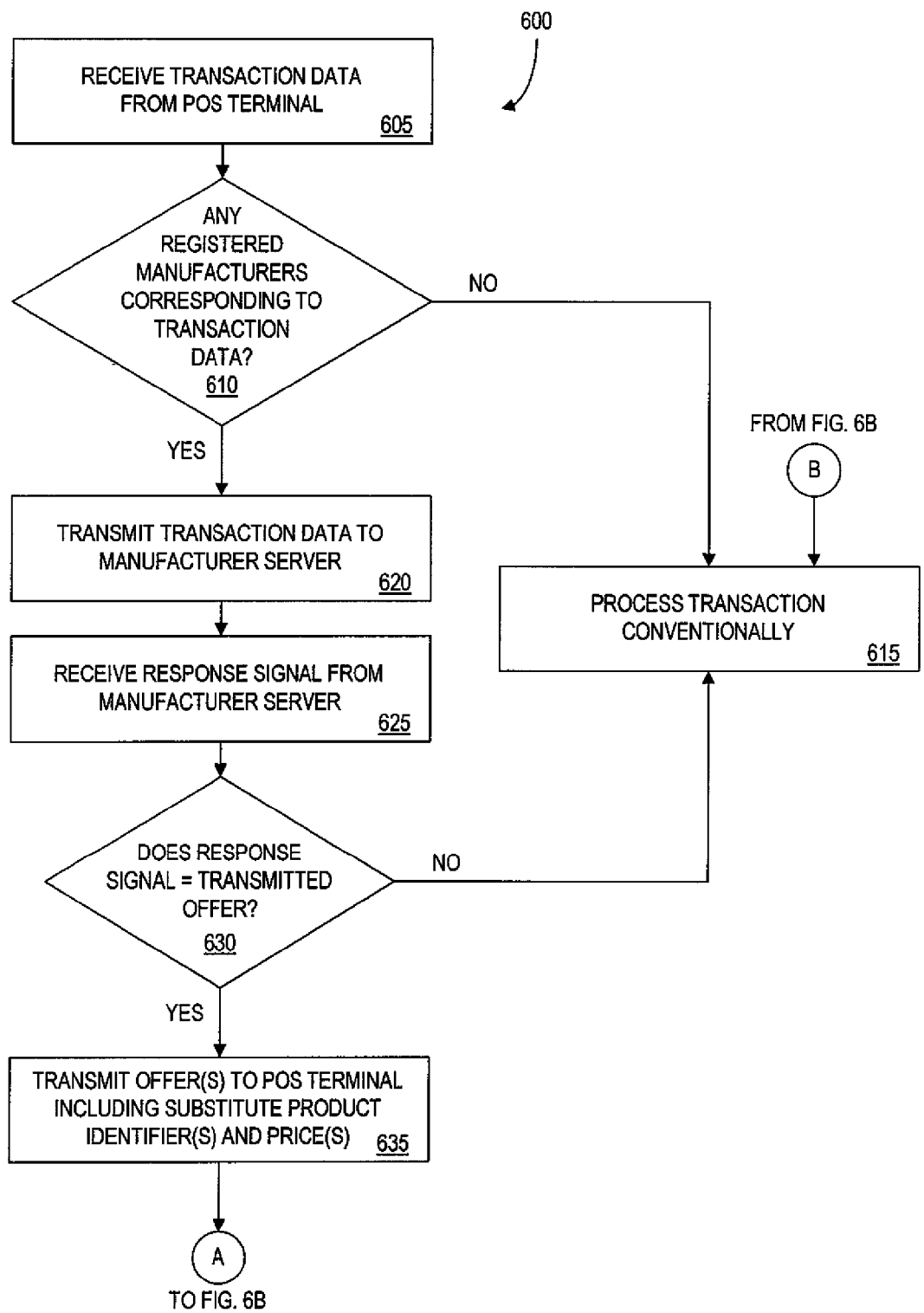
FIGS. 6A & 6B together comprise a flowchart illustrating a process performed by a POS server in accordance with one embodiment of the present invention.
Figure 6B:
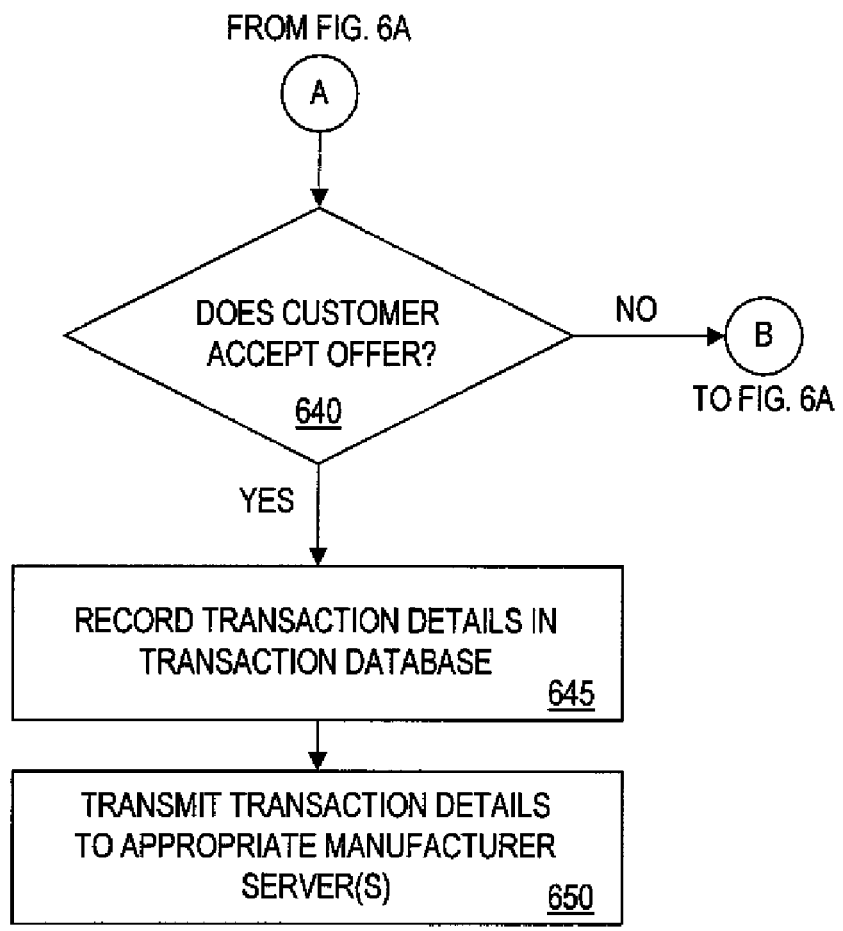

With reference to FIG. 6, a flowchart 600 describing the method performed by the POS server 120 in accordance with one embodiment of the present invention is shown. The POS server 120 receives transaction data from a POS terminal 110 regarding an original product presented for purchase by a customer (step 605). Based on instructions provided in program 365, and information contained in the inventory database 370, the transaction database 380 and the manufacturer database 390, a determination is made by the POS server 120 as to whether any manufacturers are registered to receive transaction data (step 610) corresponding to the original product. If no registered manufacturers correspond to the transaction data, the transaction is processed conventionally (step 615) and the sale of the original product is completed at the POS terminal 110. In one embodiment, a signal is transmitted to the POS terminal 110 to indicate that no substitute product offer is available. In another embodiment, no signal is sent to the POS terminal 110, and the sale of the original product is completed at the POS terminal 110 after a designated amount of time has passed and no information has been received from the POS server 120.

It is to be understood that there may be many situations in which no substitute products are offered. For example, if there are no alternative substitute products available in the inventory database 370 corresponding to the inventory of a particular retailer, the POS server 120 may conclude that no substitute product is available. In another example, there may be no registered manufacturers which could offer substitute products for the original product.

If there are registered manufacturers which correspond to the transaction data (step 610), the transaction data is transmitted to one or more manufacturer servers 140 (step 620) and the POS server 120 awaits receipt of a response signal from the one or more manufacturer servers 140 (step 625). If the POS server 120 receives a response signal indicating that one or more manufacturers transmitted an offer for a substitute product (step 630), the one or more substitute product offers (including the substitute product identifier(s) and price(s)) are transmitted to the POS terminal (step 635). If no response is received from the manufacturer server(s) or if responses are received from the manufacturer server(s) indicating that no substitute product offers are to be made (step 630), the sale of the original product is processed conventionally and the sale of the original product is completed (step 615). If the customer does not accept the offer for the substitute product (step 640), the sale of the original product is also processed conventionally (step 615).

If the customer does accept the offer (step 640), an acceptance signal is received from the POS terminal 110 and the transaction details are recorded in the transaction database 380 (step 645). The POS server 120 also transmits the transaction details to the appropriate manufacturer server(s) 140 (step 650). This information is ultimately used to assure that the manufacturer of the substitute product compensates the retailer for the amount of the discount. In one embodiment of the present invention, if several manufacturers have provided substitute product offers, only the one manufacturer whose substitute product offer was accepted by the customer receives an indication of the customer's acceptance. In another embodiment of the present invention, all of the manufacturers who have submitted substitute product offers receive information regarding the completion of the substitute product sale.

Figure 7:
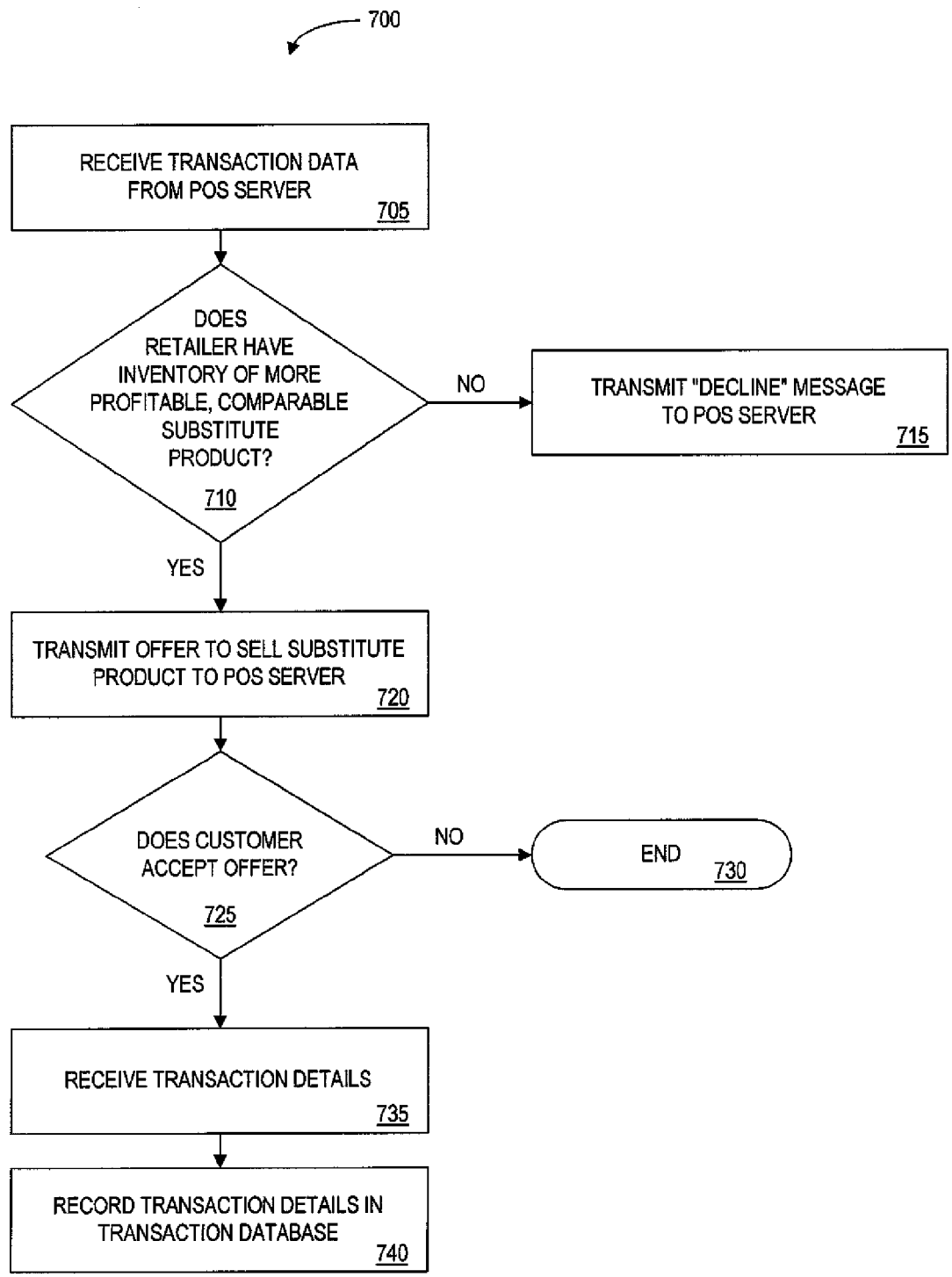
FIG. 7 is a flowchart illustrating a process performed by a manufacturer's server in accordance with one embodiment of the present invention.

With reference to FIG. 7, a flowchart 700 describing the method performed by a manufacturer server 140 in accordance with one embodiment of the present invention is shown. The manufacturer server 140 receives transaction data from the POS server 120 regarding an original product presented for purchase by a customer (step 705). The manufacturer server 140 may also receive information regarding the inventory of a retailer from the inventory database 370 of the POS server 120. The manufacturer server 140 determines whether the retailer has inventory of one or more profitable and comparable substitute products (step 710). If not, the manufacturer server may transmit a decline message to the POS server 120 (step 715). If the retailer does have sufficient inventory of more profitable and comparable substitute products, the manufacturer server 140 transmits an offer to sell one or more substitute product(s) to the POS server 120 (step 720). This offer includes a substitute product identifier and a substitute product price to be conveyed to the customer. If the customer accepts the offer (step 725), transaction details are ultimately received from the POS server 120 (step 735) and the transaction details are recorded in the transaction database 480 (step 740). If the customer does not accept the offer, the manufacturer server 140 may update the transaction database 480 to record that no transaction was completed for a specific substitute product offer, or the manufacturer server may simply take no action in response to the customer's decline of the substitute product offer (step 730).

In determining if the retailer has inventory of more profitable but comparable product, various alternate procedures may be used. In one embodiment, the manufacturer server 140 queries the inventory database 370 and the manufacturer product database 470 to determine if a more profitable but comparable product is available. In another embodiment, the manufacturer server 140 may query the POS server 120 to see if the retailer has an available inventory of a substitute product or may be based upon an assumption that the retailer is likely to have inventory of such a substitute product. In another embodiment, the profitability determination may be made automatically by the manufacturer server 140 or may be made manually by an operator of the manufacturer server 140. Such an evaluation may be based on various factors including those found in inventory database 370 such as: expiration dates, retail and floor prices, upcoming sales and promotions, demand rates, and forecasts, among others. It is to be understood that there are numerous ways to accomplish this determination, each of these ways falling within the scope of the instant invention.

Figure 8A:
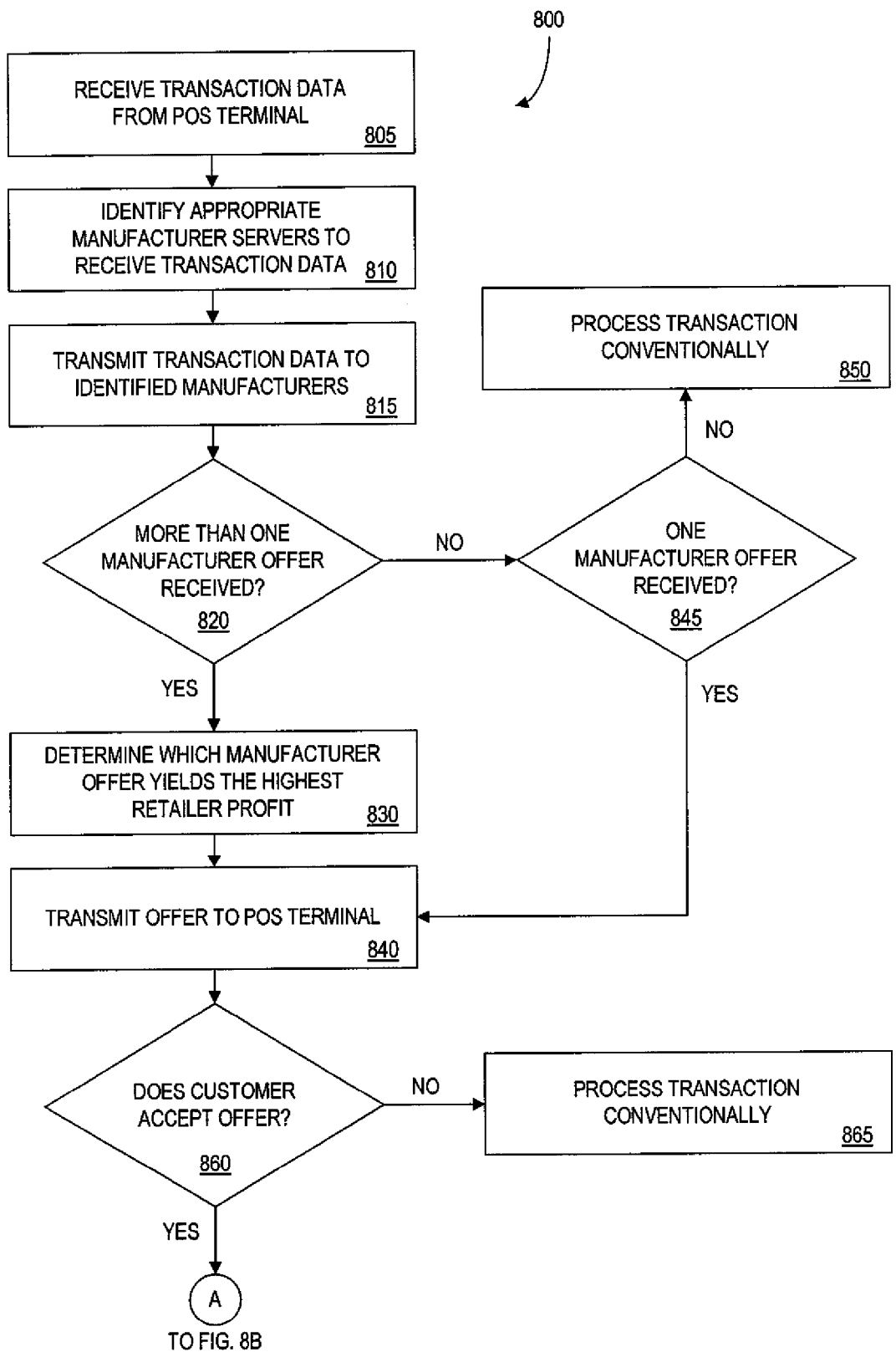
FIGS. 8A and 8B together comprise a flowchart illustrating a process performed by a POS server in accordance with another embodiment of the present invention.
Figure 8B:
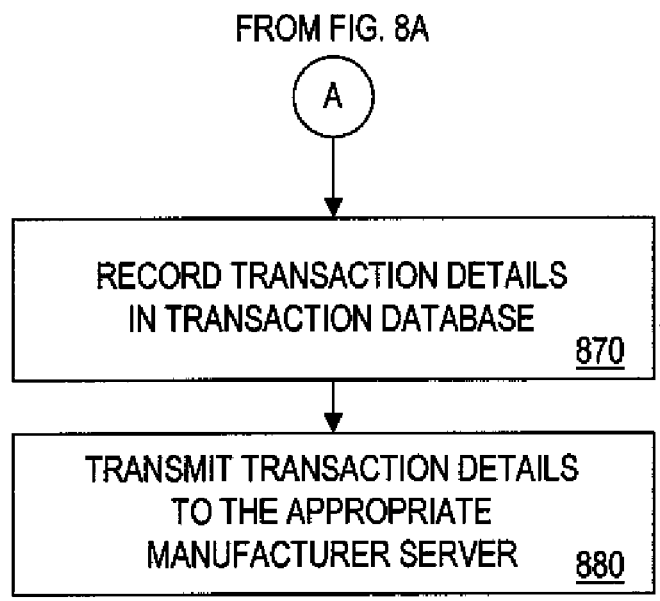

With reference to FIGS. 8A and 8B, a flowchart 800 describing the method performed by a POS server 120 in accordance with another embodiment of the present invention is shown. In this embodiment, multiple manufacturers are contacted by the POS server 120, which screens any offers to determine which offer yields the highest retailer profit. The POS server 120 transmits only this highest profit yielding offer to the POS terminal 110.

The POS server 120 receives transaction data from a POS terminal 110 regarding an original product presented for purchase by a customer (step 805). Based on instructions provided in program 365, and information contained in the inventory database 370, the transaction database 380 and the manufacturer database 390, the POS server 120 identifies appropriate manufacturer servers to receive the transaction data (step 810). In so doing, the POS server 120 may query the manufacturer database 390 for information. Appropriate manufacturers may be those sharing a similar Standard Industry Classification (SIC) code as the original product presented for purchase by a customer, or may be those manufacturers that are preregistered with the POS server 120. As such, manufacturers can subscribe for the service or can be sent offers regardless of their affirmative participation in the program. Transaction data is then transmitted to the identified manufacturer(s) (step 815). If more than one manufacturer offer is received (step 820), the POS server 120 determines which manufacturer offer yields the highest retailer profit (step 830) and transmits the chosen offer to the POS terminal 110 (step 840). If only one manufacturer offer was received (step 845), the POS server 120 transmits the offer to the POS terminal 110 (step 840). If no manufacturer offer is received (step 845), a signal is transmitted to the POS terminal 110 to process the sale of the original product presented by the customer in a conventional manner (step 850).

If the customer does not accept the offer (step 860), the sale of the original product is completed conventionally at the POS terminal 110 (step 865). If the customer does accept the offer (step 860), a signal is received from the POS terminal 110 indicating acceptance of the offer and the POS server 120 records the transaction details, including price, product identifier, retailer identification, and the like, in the transaction database 390 (step 870). The POS server 120 then transmits the transaction details to the appropriate manufacturer server which provided the accepted substitute product offer (step 880).

In determining which manufacturer offer yields the highest retailer profit (step 830), various techniques may be used. The evaluation may include queries of the inventory database 370, the transaction database 380 and the manufacturer database 390. As such, the evaluation may be based on factors such as expiration dates, retail and floor prices, upcoming sales and promotions, demand rates, and forecasts, among others. It is to be understood that these and other factors may be used in the determination of which manufacturer offer would yield the highest profit for the retailer.

Figure 9:
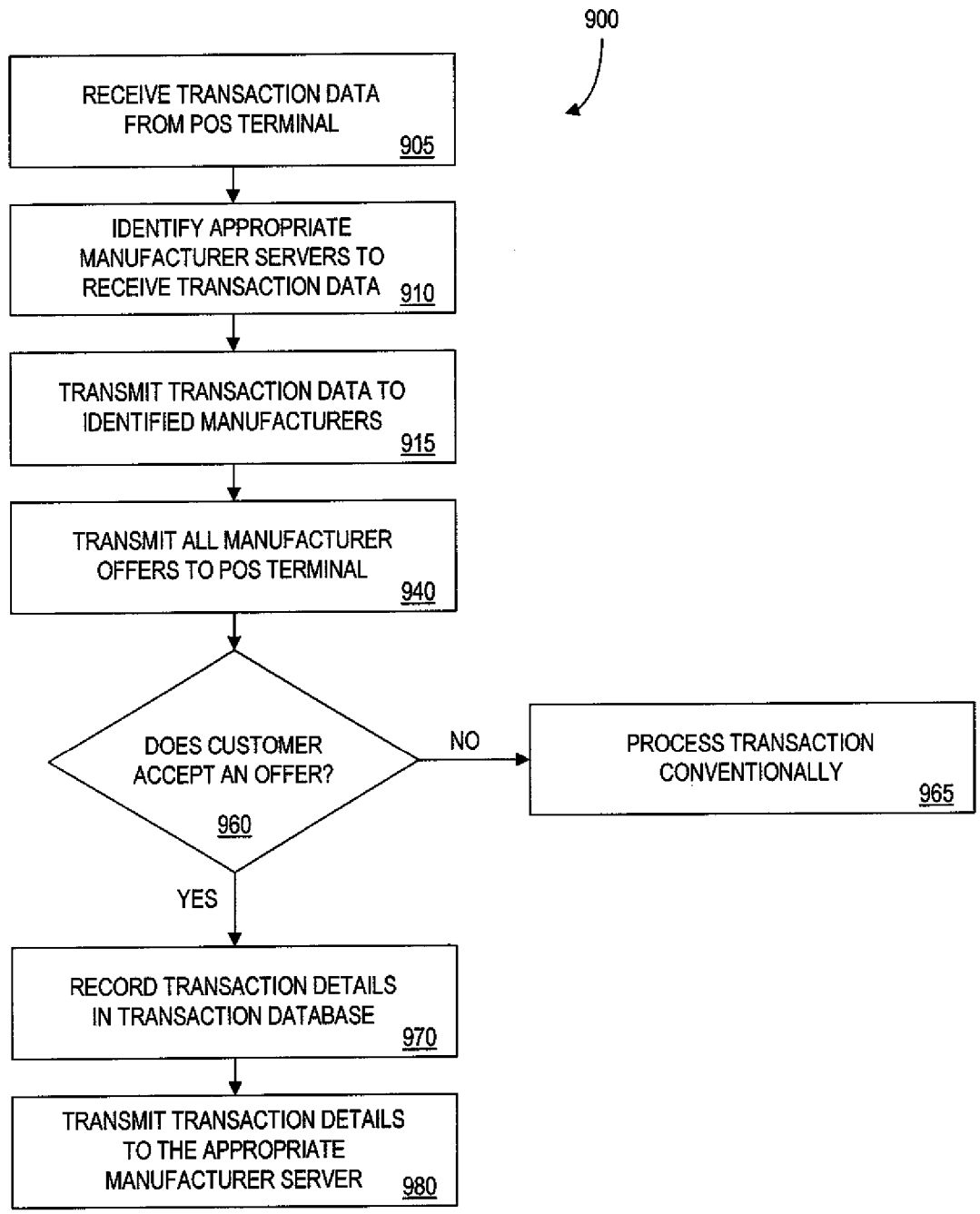
FIG. 9 is a flowchart illustrating a process performed by a POS server in accordance with another embodiment of the present invention.

With reference to FIG. 9, a flow chart 900 describing the method performed by the POS server 120 in accordance with another embodiment of the present invention is shown. In this embodiment, multiple manufacturers are contacted by the POS server 120 and, if multiple offers are received, all of the multiple offers are communicated to the customer. In response, the customer may select one or more substitute product offers.

The POS server 120 receives transaction data from a POS terminal 110 regarding an original product presented for purchase by a customer (step 905). Based on instructions provided in program 365, and information contained in the inventory database 370, the transaction database 390 and the manufacturer database 390, the POS server 120 identifies appropriate manufacturer servers to receive transaction data (step 910), in much the same manner as in the aforementioned embodiment of FIG. 8 (see step 810). The POS server 120 then transmits any manufacturer offers to the POS terminal 110 (step 940).

If the customer does not accept any offer (step 960), the sale of the original product is completed conventionally at the POS terminal 110 (step 965). If the customer does accept one or more offers (step 960), a signal is received from the POS terminal 110 confirming acceptance of one or more of the offers and the POS server 120 records the transaction details in the transaction database 390 (step 970). The POS server 120 then transmits the transaction details to the appropriate manufacturer server(s) which provided the accepted substitute product offer(s) (step 980).

Figure 10:
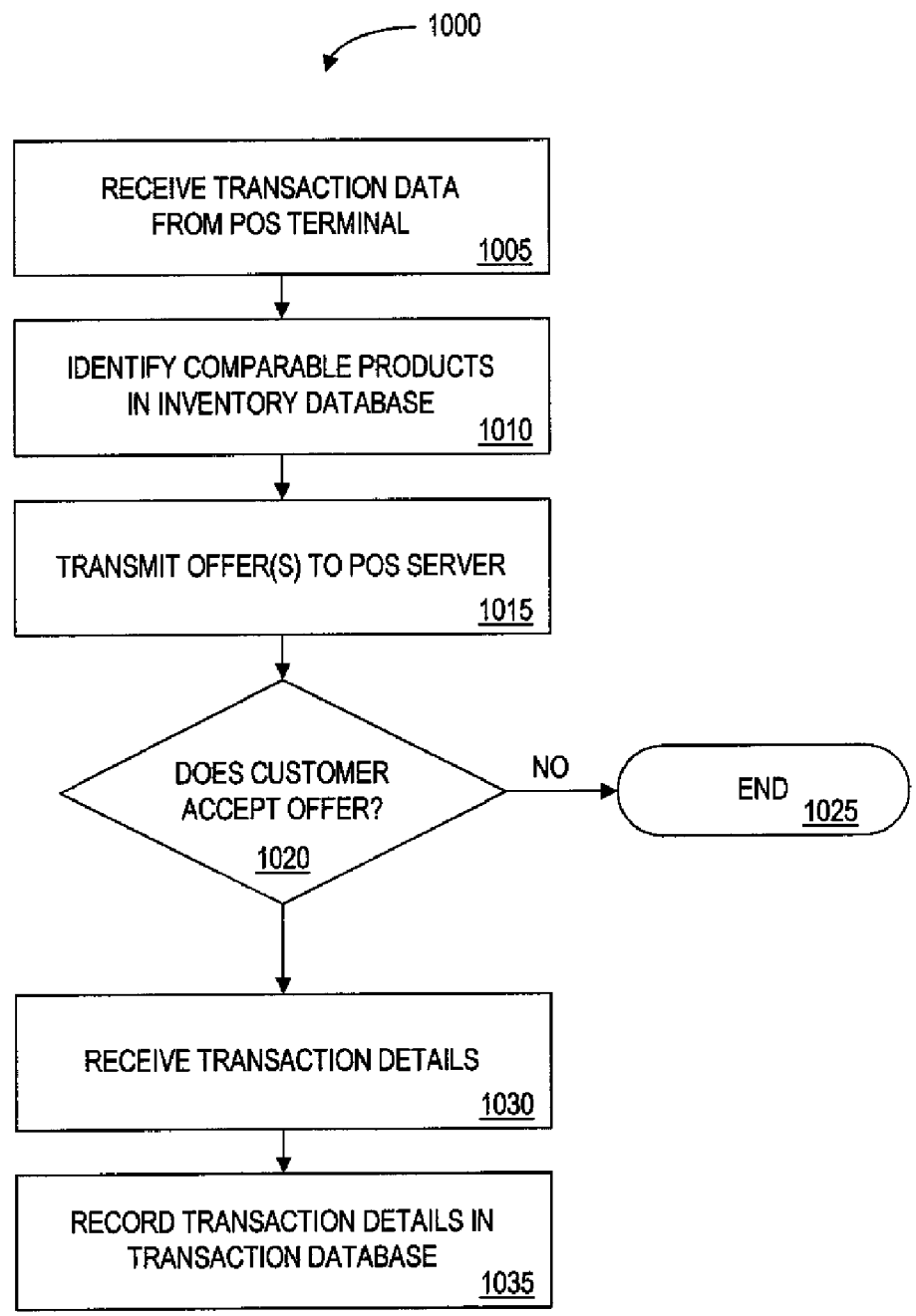
FIG. 10 is a flowchart illustrating a process performed by a manufacturer's server in accordance with various embodiments of the present invention.

With reference to FIG. 10, a flow chart 1000 describing the method performed by a manufacturer server 140 in accordance with the embodiments of FIGS. 8 and 9 is shown. The manufacturer server 140 receives transaction data from the POS server 120 regarding an original product presented for purchase by a customer (step 1005). The manufacturer server 140 also receives information regarding the inventory of a retailer from inventory database 370 of the POS server 120. The manufacturer server 140 identifies comparable products in the inventory database 370 (step 1010) and determines whether any substitute product offer is to be made to the customer. If so, the substitute product offer is transmitted to the POS server 120 (step 1015). If the customer does not accept the offer (step 1020), the manufacturer server 140 may record various details regarding the rejection of the substitute product offer, or otherwise end the process (step 1025). If the customer does accept the offer (step 1020), the manufacturer server 140 receives the transaction details (step 1030) and records these details in transaction database 480 (step 1035).

Additional Alternate Embodiments

It is also to be understood that various additional alternative embodiments are also envisioned in the present invention. In one such alternate embodiment, the substitute product offer may be supplemented by a supplemental or complementary product offer, rebate, or the like. Such supplemental product offering techniques are disclosed in commonly-assigned and co-pending patent application Ser. No. 08/994,426, which is hereby incorporated by reference.

In another embodiment of the present invention, the POS server 120 does not transmit transaction data directly to the manufacturers server 140. Rather, a "middle man" system is used in which the POS terminal 110 transmits data to a central service (which may be operated for example by a credit card processor or issuer) which then communicates with manufacturers on behalf of the POS server 120.

In another embodiment of the present invention, a secure database can be employed by the POS server 120 to receive and store manufacturer offer rules from manufacturer servers 140. In such an embodiment, manufacturers need not be queried in real-time during the transaction. As such, the POS server 120 would contain all of the necessary rules and decision-making ability to determine whether substitute product offers are to be made, and to communicate the substitute product offers to the POS terminal 110. The use of such an alternate embodiment would potentially reduce the time necessary to determine whether substitute product offers are to be made. A technique for ceasing supplementary product offers provided by POS terminals when transaction volume surpasses predetermined levels can be seen in commonly-owned, co-pending U.S. patent application Ser. No. 09/045,386 entitled "Method and Apparatus for Controlling the Performance of a Supplementary Process at a Point of Sale Terminal," filed Mar. 20, 1998, incorporated by reference herein. The present invention recognizes that customers are often unwilling to wait on long slow-moving lines. As such, this embodiment may significantly reduce the time needed to present substitute product offers to customers.

In another embodiment of the present invention which also addresses this concern regarding time delays in offering substitute products to customers, a computer program is used to temporarily stop the use of the substitute product offering techniques of the present invention if the transaction volume (number of transactions per minute) surpasses a predefined threshold. As such, during busy shopping periods, retailers could suspend substitute product offerings to accelerate sales of original products. In addition, in each of the embodiments of the present invention, the system may be configured to automatically and conventionally complete the sale of the original product, if no substitute product offers are received from the POS server 120 within a predetermined time.

In another embodiment of the present invention, the POS server 120 may be programmed to determine whether substitute product offers are to be made based on inventory and information regarding only the retailer. In this embodiment, no information is need from the manufacturer servers 140. As such, the retailer may directly market substitute products to the customer based on the retailer's own rules. This embodiment may be particularly effective in advancing the sale of overstocked or distressed items in a particular retailer.

In another embodiment to the present invention, secure databases of information regarding manufacturer offer rules and/or retailer offer rules are provided directly to the POS terminals 110. In this embodiment, the POS terminals 110 may directly determine whether substitute product offers are to be made to customers. The use of such an embodiment would eliminate the need to query various manufacturers, as well as the need to query the POS server 120. Such information may transmitted to the POS terminals 110 in a number of ways. For example, this information may be encrypted and transmitted over the Internet, communicated over a telephone network or transmitted over a LAN or WAN.

In yet another embodiment to the present invention, the retailer may gather subsidy information from potential subsidizers who are willing to subsidize a portion of the substitute product offer in exchange for some action by the customer. For example, a customer may seek to purchase a product, model X, at the point of sale. This transaction information is communicated to the POS server, along with a customer profile, including information such as frequent shopper information, to a bank. In response, the bank may present the customer with an offer that will add $Y to upgrade the customer's purchase to model Z, if the customer agrees to apply for and/or accept a new credit card offer from the bank. The customer may further be required to purchase the camera with the approved new credit card.

Although the present invention has been described with respect to various embodiments thereof, it is to be understood that various substitutions may be made in those embodiments described herein, without the departing from the spirit and scope of the present invention.

What is claimed is:

1. A method for promoting a sale of a substitute product, comprising:
   receiving, by a point of sale terminal, transaction data regarding an original product presented for purchase by a consumer at the point of sale terminal;
   transmitting, by the point of sale terminal, said transaction data to a server of a manufacturer during a transaction session;
   upon receipt, by the point of sale terminal, of information regarding a substitute product from said server, offering, by the point of sale terminal, said substitute product to said consumer before the transaction session terminates;
   consummating, by the point of sale terminal, a sale of said original product if at least one of (a) no information regarding said substitute product is received from said server, and (b) said consumer declines said offering; and
   consummating, by the point of sale terminal, a sale of said substitute product upon acceptance by said consumer of said offering.

2. The method of claim 1, wherein said consummating a sale comprises removing transaction data regarding said original product from pending sale data and substituting transaction data regarding said substitute product in said pending sale data.

3. The method of claim 2 wherein said transaction data includes at least one of: product price, product identifier and product UPC code.

4. The method of claim 1, further comprising transmitting an identifier regarding said substitute product to said server.

5. The method of claim 1, further comprising transmitting an identifier regarding said substitute product to a manufacturer of said substitute product.

6. The method of claim 1 wherein said transaction data comprises an original product identifier and a price.

7. The method of claim 1 wherein said original and substitute products have different manufacturers.

8. The method of claim 1 wherein one manufacturer manufactures both said original product and said substitute product.

9. The method of claim 1 wherein said offering comprises transmitting information regarding said substitute product to said consumer via at least one of: a printer, a display terminal and a speaker.

10. The method of claim 1 further comprising transmitting to said server inventory information of a potential substitute of said original product.

11. The method of claim 1, wherein the consummating of the sale of said original product is further conducted if a retailer's transaction volume exceeds a predetermined threshold during a predetermined amount of time.

12. The method of claim 11 wherein consummating a sale of said original product occurs prior to said offering.

13. The method of claim 1 further comprising transmitting additional information to said server for determination of said possible substitute product, said additional information comprising at least one of: product profit margin information, product inventory information, product expiration date information, retail product price information, product floor price information, product sales information, sale and promotional pricing information, product demand information, product forecast information, product class information, product pricing information, and information regarding product features.

14. The method of claim 1, further comprising:
identifying the manufacturer to receive the transaction data.

15. The method of claim 14, wherein said manufacturer comprises plurality of manufacturers.

16. The method of claim 15, wherein the information regarding the substitute product comprises substitute product offers from said plurality of manufacturers.

17. The method of claim 16, further comprising selecting the offering of the substitute product as one of said substitute product offers from said plurality of manufacturers.

18. An apparatus for promoting a sale of a substitute product, comprising:
a storage device; and
a processor disposed in communication with the storage device, the storage device storing a program for controlling the processor, and the processor configured to:
receive transaction data regarding an original product presented for purchase by a consumer at a point of sale terminal;
transmit said transaction data from the point of sale terminal to a server of a manufacturer during a transaction session;
upon receipt of information regarding a substitute product from said server, transmit an offer of said substitute product to said consumer before the transaction session terminates;
consummate a sale of said original product if at least one of (a) no information regarding said substitute product is received from said server, and (b) said consumer declines said offering; and
consummate a sale of said substitute product upon acceptance by said consumer of said offering.

* * * * *